United States Patent [19]

Inoue et al.

[11] Patent Number: 5,744,933
[45] Date of Patent: Apr. 28, 1998

[54] VENDING MACHINE FOR CHARGING A SECONDARY BATTERY OF A MOBILE PHONE

[75] Inventors: Katsuhiro Inoue; Katsuya Numa, both of Tokyo, Japan

[73] Assignee: KN Technos Co., Ltd., Tokyo, Japan

[21] Appl. No.: 746,568

[22] Filed: Nov. 13, 1996

[30] Foreign Application Priority Data

| Nov. 13, 1995 | [JP] | Japan | 7-317044 |
| Nov. 6, 1996 | [JP] | Japan | 8-294079 |
| Nov. 6, 1996 | [JP] | Japan | 8-294080 |
| Nov. 6, 1996 | [JP] | Japan | 8-294081 |

[51] Int. Cl.$^6$ .................................................. H02J 7/04
[52] U.S. Cl. .......................... 320/110; 370/148; 370/151
[58] Field of Search ................................ 320/2, 20, 21, 320/22, 23, 39, 40, 110, 48, 151, 116; D20/1-9; 221/92, 97, 100, 123, 124, 125, 135

[56] References Cited

U.S. PATENT DOCUMENTS

| 4,951,308 | 8/1990 | Bishop et al. | 379/91 |
| 5,432,426 | 7/1995 | Yoshida | 320/20 |
| 5,449,997 | 9/1995 | Gilmore et al. | 320/39 |
| 5,489,836 | 2/1996 | Yuen | 320/32 |
| 5,544,784 | 8/1996 | Malaspina | 221/135 |
| 5,627,451 | 5/1997 | Takeda | 320/21 |
| 5,631,536 | 5/1997 | Tseng | 320/15 |

FOREIGN PATENT DOCUMENTS 7-312229  11/1995  Japan.

OTHER PUBLICATIONS

Nikkei Electronics No. 649 (Nov. 20, 1995), pp. 104–110, together with an English Language Abstract.

Primary Examiner—Peter S. Wong
Assistant Examiner—Gregory J. Toatley, Jr.
Attorney, Agent, or Firm—Greenblum & Bernstein P.L.C.

[57] ABSTRACT

A vending machine for charging a secondary battery of a mobile phone is provided with a plurality of charging blocks, each conforming to a specification of a mobile phone and a secondary battery of the mobile phone, for charging plural kinds of secondary batteries used in plural kinds of mobile phones, charging time selection buttons for instructing a charging time corresponding to each of the plurality of charging blocks, lock/unlock mechanism for locking/unlocking a key on a door provided in each of the plurality of charging blocks, a stocker for receiving at least one coin and/or at least one banknote, a calculator for calculating an amount of money of said coin and/or bill which have been received in the stocker, and a charging control circuit for controlling each of the plurality of charging blocks to charge a secondary battery of a mobile phone attached in one of the plurality of charging blocks, in accordance with the amount of money calculated by the calculator and the charging time instructed by the selection buttons.

31 Claims, 18 Drawing Sheets

| CHARGED ELECTRICITY AMOUNT | 10 | 20 | 40 | 60 | 80 | 90 | 100 | BATTERY TEMPERATURE |
|---|---|---|---|---|---|---|---|---|
| TERMINAL VOLTAGE (V) | 1.37 | 1.39 | 1.40 | 1.41 | 1.47 | 1.50 | 1.53 | 0°C |
| | 1.35 | 1.36 | 1.38 | 1.39 | 1.43 | 1.45 | 1.46 | 20°C |
| | 1.30 | 1.34 | 1.37 | 1.37 | 1.40 | 1.41 | 1.42 | 45°C |
| TIME (MIN) | 75 | 60 | 45 | 35 | 15 | 10 | 5 | |

VENDING MACHINE FOR CHARGING A SECONDARY BATTERY OF A MOBILE PHONE

BACKGROUND OF THE INVENTION

The present invention relates to a vending machine for charging a secondary battery of a mobile phone, a vending system composed of at least one first unit which includes a plurality of charging apparatus, each for charging a secondary battery (so called "rechargeable battery") of a mobile phone and a second unit for performing charging control, and a charging apparatus used in a vending machine or vending system for charging a secondary battery of a mobile phone.

In recent years, a variety of mobile phones (including a cellular phone or personal handy phone) are widely spread and used by many people. A maximum continuous waiting time and/or a maximum continuous talking time of respective mobile phones is usually preset in accordance with the capacity of an installed secondary battery in the mobile phone. Accordingly, it is needed to charge the secondary battery due to the lack of the remaining capacity thereof when the mobile phone is used for a long time.

Conventionally, in order to charge a secondary battery of a mobile phone, the mobile phone's holder must take back it to his( or her) office or his( or her) home and set it on a dedicated charger, such as a desk-type quick charger.

There are many kinds of secondary batteries which are attached or installed as a power source to a mobile phone, a portable electric device such as an electric notebook, and a laptop-type personal computer. Among them, a nickel-cadmium (Ni—Cd) battery, a nickel-metalhydride (Ni—MH) battery and a lithium-ion (Li-ION) battery are generally used. Since each type of secondary batteries has unique charging characteristics, a dedicated charging apparatus must be provided for each corresponding secondary battery.

For example, the Ni—Cd battery and Ni—MH battery have characteristics such that the temperature of the secondary battery will suddenly rise up and the terminal voltage of the secondary battery will suddenly change when the secondary battery reaches full-charged condition or overcharged condition. Accordingly, it is necessary to incorporate a charge control circuit into the charging apparatus, for adequately controlling the charging operation for a the secondary battery.

On the other hand, a Li-ION battery as a secondary battery is usually charged by a charging apparatus employing a constant current and constant voltage charging method. Accordingly, it is necessary to control the charging apparatus such that the constant current charge is switched to a constant voltage charge when the terminal voltage of the Li-ION battery reaches the rated charging voltage. Therefore, it is necessary to design the charging apparatus to minimize the detection error of the terminal voltage of the Li-ION battery. Furthermore, it is required to precisely detect the full-charged (or 100% charged) condition in the Li-ION battery, in order to prevent it from catching fire or giving out smoke, due to the overcharge thereof.

As clearly understood from the above description, the conventional charging apparatus for charging a secondary battery is designed, assuming that a full-charge must be performed. Furthermore, many charge control techniques for preventing an occurrence of an accident due to overcharging have been proposed.

Depending on charging operation circumstances, a mobile phone's holder must take back it to his (or her) office or his (or her) home in order to charge the completely or partially discharged secondary battery of the mobile phone. In other words, this means that, if it is difficult or impossible to take back a mobile phone to an office or home, it is impossible to charge the secondary battery of a mobile phone and the holder is not able to use a mobile phone any more.

To cope with the above problem, the holder must carry another secondary battery, which has been fully charged, in his (or her) attache case or hand bag. It would be, however, troublesome to carry the extra secondary battery due to its volume and weight.

From the viewpoint of a portable electric device such as a mobile phone, when a secondary battery of a portable electric device has been completely consumed and it becomes to be necessary to recharge the secondary battery, the user does not always require that the secondary battery be fully charged up. For example, when a mobile phone's holder is out with the mobile phone, and the secondary battery of the mobile phone has been completely consumed, there is a case where the holder has to urgently use the mobile phone although it is necessary to recharge the secondary battery. In such a case, it would be good enough if the holder is able to use the mobile phone for only five(5) or ten(10) minutes by quickly recharging the secondary battery. That is to say, it would be sufficient to not fully (100%) but partially (several tens % of full-charged condition) charge the secondary battery in such a manner that the holder can use the mobile phone for a short time.

Taking the above into consideration, it is desirable to have a vending machine which provides a quick charger conveniently to charge a secondary battery of a portable electric device so as to make the device operable for a short period of time when an user carries the device outdoors and the secondary battery runs out.

SUMMARY OF THE INVENTION

The present invention, therefore, has as its principal object to provide a vending machine for conveniently charging an empty secondary battery of a mobile phone, when a holder of the mobile phone carries outdoors, without taking back it to his/her office or home.

According to a first aspect of the present invention, the foregoing object is attained by providing a vending machine for charging a secondary battery of a mobile phone, which comprises a plurality of charging means, each conforming to a specification of a mobile phone and a secondary battery of the mobile phone, for charging plural kinds of secondary batteries used in plural kinds of mobile phones; instruction means for instructing a charging time corresponding to each of the plurality of charging means; lock/unlock means for locking/unlocking a key on a door provided in each of the plurality of charging means; reception means for receiving at least one coin and/or at least one banknote; calculation means for calculating an amount of money of the coin and/or banknote which have been received in the reception means; and charging control means for controlling each of the plurality of charging means to charge a secondary battery of a mobile phone attached in one of the plurality of charging means, in accordance with the amount of money calculated by the calculation means and the charging time instructed by the instruction means.

In accordance with the first aspect of the present invention as described above, when a mobile phone's holder finds charging means suitable for his/her own mobile phone from a plurality of charging means, each conforming to a specification of a mobile phone and a second battery of the mobile phone, attaches the mobile phone to the charging means, inserts an appropriate amount of coin or banknote into reception means, instructs his/her desired charging time from instruction means, and locks the charging means by lock/unlock means, the machine calculates the amount of received coin or banknote, controls the charging means in accordance with the calculated amount and the instructed time such that the charging means charges the secondary battery of the mobile phone attached to the charging means.

It is preferred in the first aspect in the present invention that the calculation means includes comparison means for comparing the amount of money of the coin and/or banknote received in the reception means with an amount of money equivalent to the charging time instructed by the instruction means; and change control means for controlling to make change in accordance with the comparison result from the comparison means.

It is preferred in the first aspect of the present invention that each of the plurality of charging means includes a quick charger conforming to a predetermined type of mobile phone and a predetermined type of secondary battery, for quickly charging the secondary battery attached to the corresponding charging means; and display means for displaying status of charging operation of the quick charger.

It is preferred in the first aspect of the present invention that the quick charger includes at least two electrodes through which the electric power is to be supplied to the secondary battery, and positions of said electrodes, a shape of each of the electrodes and a charging voltage of the quick charger are uniquely defined according to a specification of the mobile phone and the secondary battery attached thereto.

It is preferred in the first aspect of the present invention that the display means includes a plurality of LEDs (light emitting devices), each of which lights in a different color, and is turned on in accordance with progress of charging operation.

It is preferred in the first aspect of the present invention that the plurality of secondary batteries include at least a Ni—Cd battery, a Ni—MH battery and a Li—ION battery.

It is preferred in the first aspect of the present invention that the charging control means includes sensing means for sensing whether or not the door in the charging means is locked by the lock/unlock means, and start control means for controlling start of charging the secondary battery of the mobile phone which has been attached in the charging means in accordance with the sensing result from the sensing means.

In the first aspect of the present invention, the quick charger may include a holder for holding an electric contact with the electrodes of the secondary battery, a voltmeter for measuring a terminal voltage of the secondary battery, a differentiation circuit for measuring a change rate in time of the terminal voltage, a constant current charging circuit for quickly charging the secondary battery, a first comparator for comparing the terminal voltage measured by the voltmeter with a predetermined charging voltage defined for the secondary battery, a second comparator for measuring the change rate in time of the terminal voltage measured by the differentiation circuit with a predetermined threshold, a register for setting the predetermined threshold, and a controller for performing control in accordance with the comparison results by the first and second comparators such that charging operation in the constant current charging circuit is halted before the secondary battery reaches full-charged condition.

It is preferred in the first aspect of the present invention that the controller further performs control such that charging operation is halted when it is determined in accordance with the comparison result by the first comparator that the measured terminal voltage exceeds a predetermined charged voltage. More preferably, when the determination is made, the secondary battery reaches within a range from approximately 60% to 90% of the full-charged condition.

It is preferred in the first aspect of the present invention that the second comparator employs a value very close to "0" as the predetermined threshold.

In the first aspect of the present invention, the quick charger may also include a holder for holding an electric contact with electrodes of the secondary battery, measuring means for measuring a terminal voltage of the secondary battery, comparison means for comparing the terminal voltage measured by the measuring means with a predetermined limited voltage defined for the secondary battery, charging means for quickly charging the secondary battery, and charging control means for performing control in accordance with the comparison results by the comparison means such that charging operation in the charging means is halted before the secondary battery reaches full-charged condition.

More preferably, in the above-constructed quick charger of the first aspect of the present invention, the predetermined limited voltage is defined within a range from approximately 60% to approximately 90% of the maximum charging voltage defined for the secondary battery.

It is another object of the present invention to provide a charging apparatus capable of quickly charging a secondary battery of a portable electric device to the extent that the portable electric device becomes operable for the time being.

According to a second aspect of the present invention, the foregoing object is attained by providing a charging apparatus for charging a secondary battery, which comprises a holder for holding an electric contact with electrodes of the secondary battery, first measuring means for measuring a terminal voltage of the secondary battery, second measuring means for measuring a change rate in time of the terminal voltage, charging means for quickly charging the secondary battery, a first comparison means for comparing the terminal voltage measured by the first measuring means with a predetermined charging voltage defined for the secondary battery, a second comparison means for comparing the change rate in time of the terminal voltage measured by the second measuring means with a predetermined threshold, and charging control means for performing control in accordance with the comparison results by the first and second comparators such that charging operation in the charging means is halted before the secondary battery reaches full-charged condition.

In accordance with the second aspect of the present invention as described above, in charging a secondary battery held by a holder, a terminal voltage of the secondary battery and a change rate in time of the terminal voltage are measured, the measured terminal voltage is compared with a predetermined charging voltage defined for the secondary battery, the measured change rate in time of the terminal voltage is further compared with a predetermined threshold. And, control is performed in accordance with these comparison results such that the charging operation is halted before the secondary battery reaches full-charged condition.

It is preferred in the second aspect of the present invention that the charging means includes a constant current charging circuit for quickly charging the secondary battery at a constant current, a voltmeter for measuring a terminal voltage of the secondary battery, and a differentiation circuit for measuring a change rate in time of the terminal voltage.

It is preferred in the second aspect of the present invention that the apparatus further comprises a register for setting the predetermined threshold.

It is preferred in the second aspect of the present invention that the charging control means performs control such that charging operation is halted when it is determined in accordance with the comparison result by the first comparison means that the terminal voltage exceeds the predetermined charging voltage.

It is preferred in the second aspect of the present invention that the second comparison means employs a value very close to "0" as the predetermined threshold.

It is preferred in the second aspect of the present invention that the secondary batteries include at least a Ni—Cd battery, a Ni—MH battery and a Li-ION battery.

It is preferred in the second aspect of the present invention that the charging control means performs control such that the charging operation is halted when it is determined that the secondary battery reaches within a range from approximately 60% to 90% of the full-charged condition.

According to a third aspect of he present invention, the foregoing object is attained by providing a charging apparatus for charging a secondary battery, which comprises a holder for holding an electric contact with electrodes of the secondary battery, measuring means for measuring a terminal voltage of the secondary battery, comparison means for comparing the terminal voltage measured by the measuring means with a predetermined limited voltage defined for the secondary battery, charging means for quickly charging the secondary battery, and charging control means for performing control in accordance with the comparison results by the comparison means such that charging operation in the charging means is halted before the secondary battery reaches full-charged condition.

In accordance with the third aspect of the present invention as described above, when a secondary battery held in a holder is charged, a terminal voltage of the secondary battery is measured, and control is performed such that the charging operation is halted before the measured terminal voltage reaches a maximum charged voltage.

It is preferred in the third aspect of the present invention that the charging means includes a constant current charging circuit for charging at a constant current.

It is preferred in the third aspect of the present invention that the measurement means includes a voltmeter.

It is preferred in the third aspect of the present invention that the secondary batteries include at least a Ni—Cd battery, a Ni—MH battery and a Li-ION battery.

It is preferred in the third aspect of the present invention that the charging operation is halted when it is determined that the terminal voltage measured by the measuring means reaches approximately 60% to 90% of the maximum charged voltage defined for the secondary battery.

It is still another object of the present invention to provide a vending system which can flexibly change charging capability in accordance with the needs in the installation site.

According to a fourth aspect of the present invention, the foregoing object is attain by providing a vending system composed of at least one first unit which includes a plurality of charging means, each conforming to a specification of a mobile phone and a secondary battery of the mobile phone, for charging plural kinds of secondary batteries used in plural kinds of mobile phones, and a second unit which performs charging control on each of the plurality of charging means, which comprises first extension means for electrically connecting at most a first predetermined number of the first units to the second unit, and second extension means for mechanically connecting plural number of sets, each composed of the first predetermined number of the first units and one second unit, with each other.

It is preferred in the fourth aspect of the present invention that the second unit includes display means for displaying a guidance concerning with the charging operation with respect to each of the plurality of charging means, instruction means for instructing a charging time corresponding to each of the plurality of charging means, lock/unlock means for locking/unlocking a key on a door provided in each of the plurality of charging means, and output means for outputting an information for unlocking the key on the door.

It is preferred in the fourth aspect of the present invention that the display means includes an LCD (liquid crystal device), the instruction means includes ten-keys, and the output means includes a printer.

It is preferred in the fourth aspect of the present invention that the second unit further includes reception means for receiving at least one coin and/or at least one banknote, calculation means for calculating an amount of money of the coin and/or bill which have been received in the reception means, and change control means for calculating a change based on the amount of money calculated by the calculation means and the charging time instructed by the instruction means, and controlling change return in accordance with the calculation result if necessary.

It is preferred in the fourth aspect of the present invention that the plurality of secondary batteries include at least a Ni—Cd battery, a Ni—MH battery and a Li-ION battery.

It is preferred in the fourth aspect of the present invention that each of the plurality of charging means in the first unit includes LEDs, each of which lights in a different color, and is turned on in accordance with progress of charging operation.

The invention is particularly advantageous since a mobile phone's holder can conveniently charge his/her own mobile phone by installing a vending machine according to the present invention at a public place such as a station, shopping mall, and hotel. If the vending machine is available, even though a secondary battery of a mobile phone runs out due to longtime operation, the holder can conveniently use the machine near by, and can recharge the secondary battery. As a result of this, the holder becomes free from carrying around an extra battery package.

Also, charging operation according to the present invention enables a portable electric device employing a secondary battery as a power source to be operable for the time being even though the charging operation does not fulfill 100% charge. Since the charging operation does not perform full-charge, it is not necessary for a charging apparatus performing the charging operation to incorporate complicated charging control which takes into consideration overcharge, and overheat and firing due to the overcharge. Thus, this contributes to simplifying the construction of circuit in the charging apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinafter, the detailed description of the preferred embodiment of a vending machine according to the present invention will be given with reference to the accompanying drawings.

Figure 1:
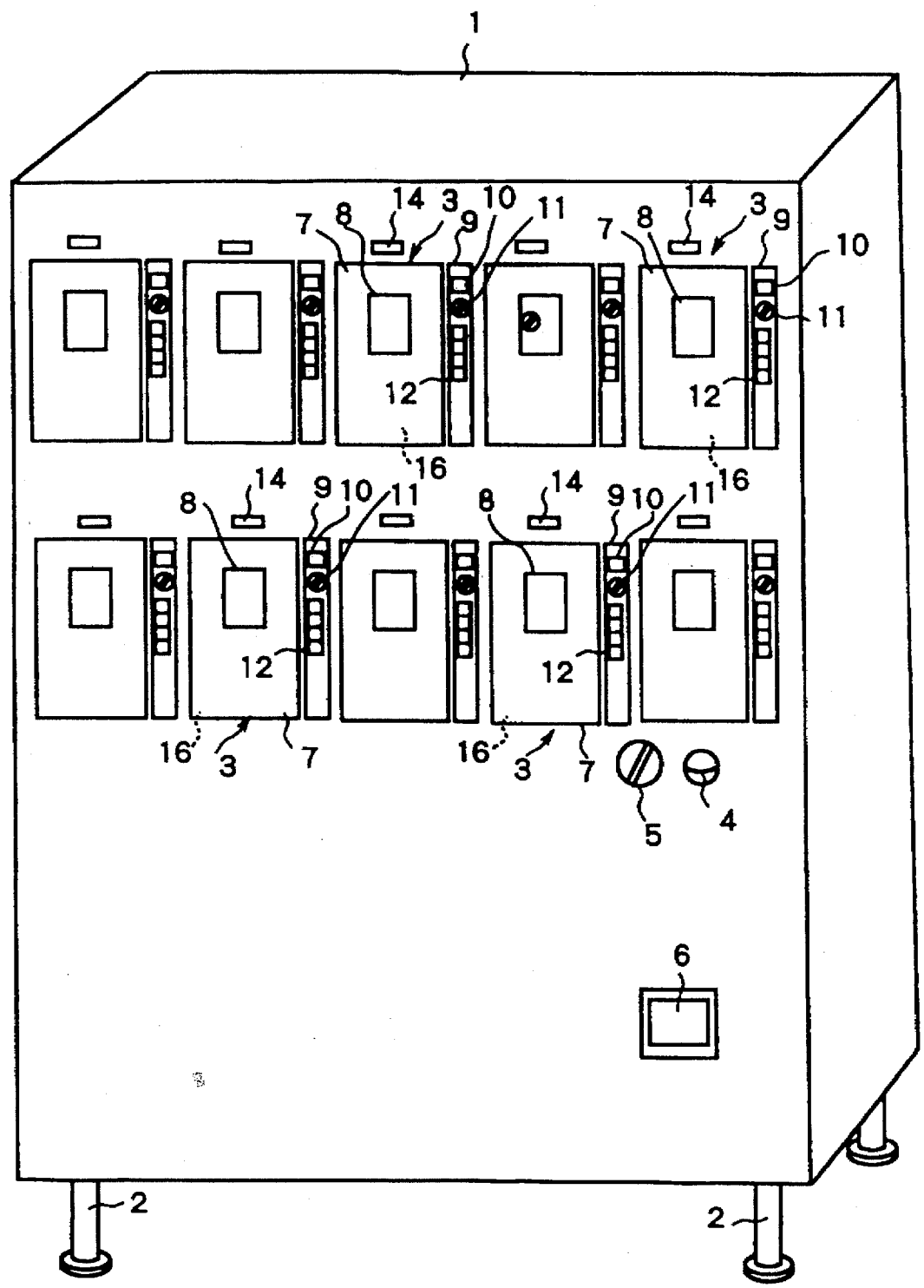
FIG. 1 is a perspective view showing a vending machine for charging a secondary battery of a mobile phone according to a typical embodiment of the present invention.

As shown in FIG. 1, a vending machine of the present embodiment is provided for selling electric power which is used to charge a mobile phone. The mobile phone is comprised of a phone body and a secondary battery which is detachably attached to the phone body. The secondary battery is of a Ni—Cd (nickel-cadmium) type in the present embodiment and set to be chargeable. It should be noted that the secondary battery could be of Nickel-metalhydride type or Lithium-ion type and the like.

As shown in FIG. 1, the vending machine is provided with a box-shaped casing 1 which is set to independently stand on a floor or ground by means of four legs 2 arranged at four corners, respectively, at the bottom of the casing 1. The vending machine is further provided with a plurality of, ten(10) in the present embodiment, charge blocks 3 on the front surface of the casing 1 wherein it is arranged as five(5) charge blocks 3 on the upper row and the remaining five (5) charge blocks 3 on the lower row.

The vending machine is still further provided with a coin inlet slot 4 at the front surface of the casing 1 and just below the lower row of the charge block 3 and on the right side and through which at least one coin is to be inserted into the casing 1, a coin return lever 5 arranged on the left side of the coin inlet slot 4 and a coin return port 6 arranged on the lower side of the coin inlet slot 4. It should be noted that a bank note inlet slot may be placed instead of or adding to the coin inlet slot 4.

Figure 3:
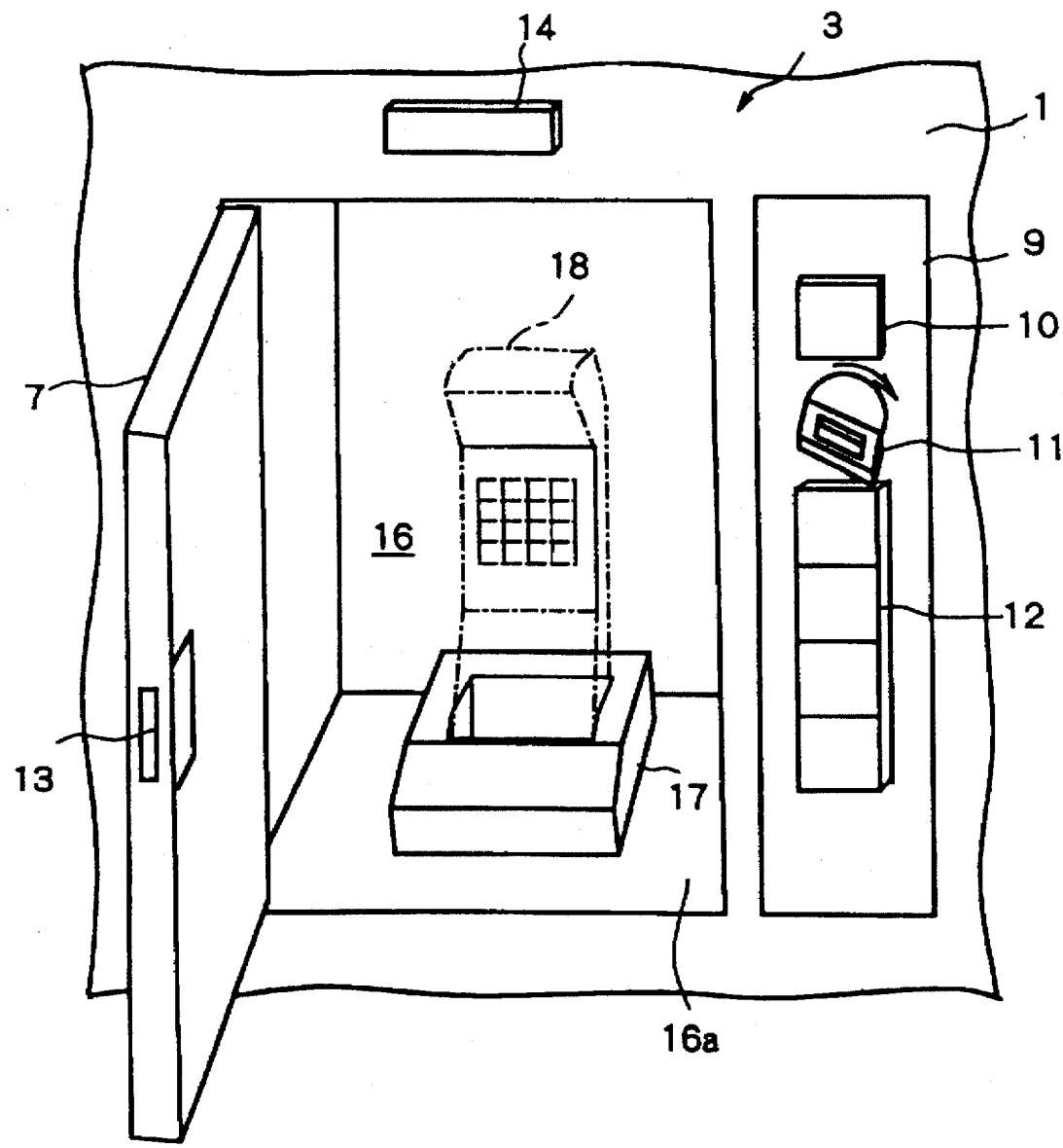
FIG. 3 is a perspective view showing an internal arrangement of a mobile phone storage room where a door of a charging block is opened.

Each of charge blocks 3 is constructed so that it is able to charge a secondary battery in a condition where it is attached to the phone body of the mobile phone. Furthermore, the charge block 3 is constructed to conform to a specification of a mobile phone and/or secondary battery. Accordingly, a notice board or plate 8 is attached to the front surface of each charge blocks 3 to explain what sort or kind and maker of the mobile phone can be charged by that block, as shown in FIG. 3. By looking at the notice board or plate 8, a mobile phone holder can find out the adaptable charge block 3 in which the mobile phone could be charged.

Figure 2:
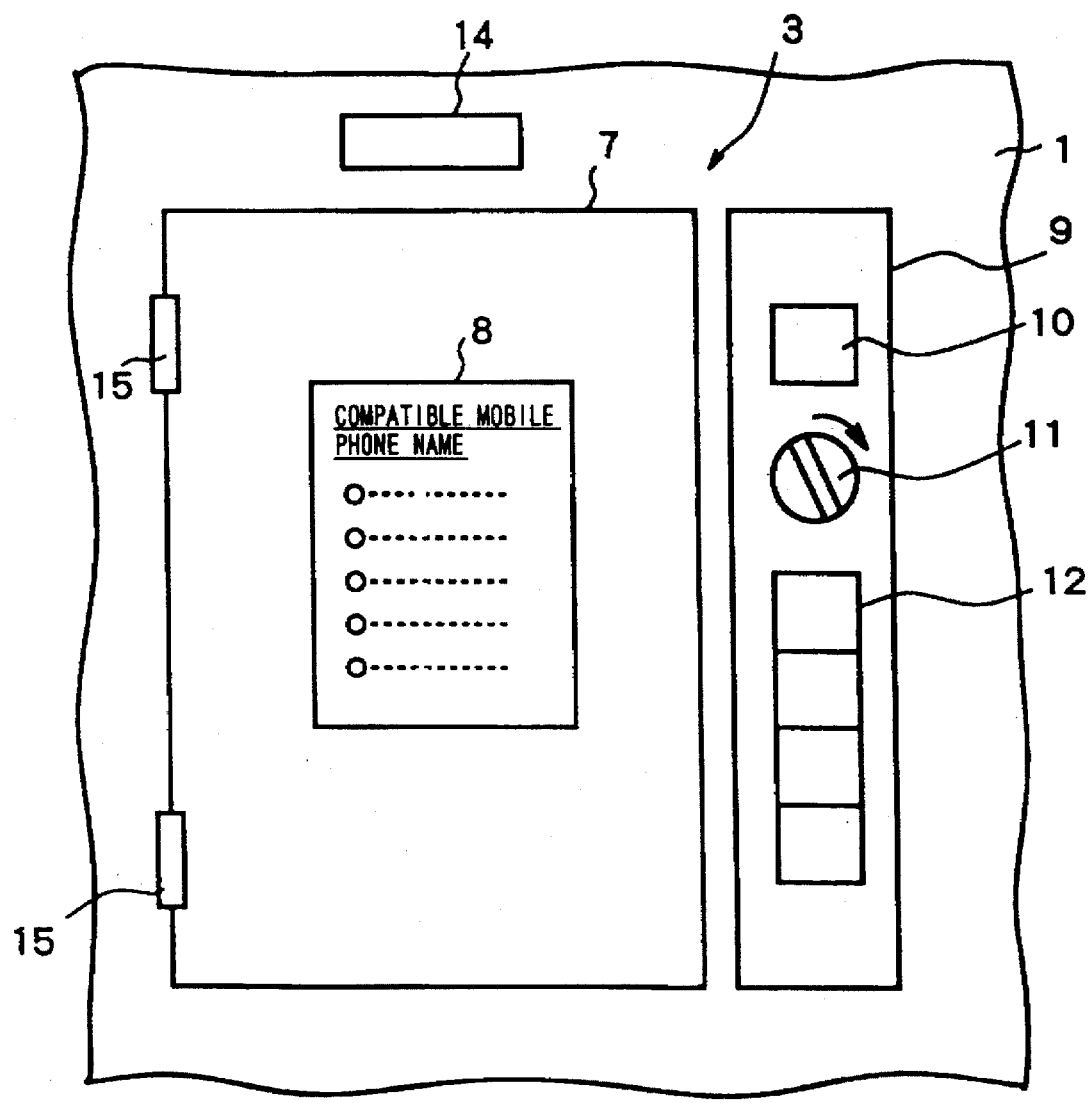
FIG. 2 is an enlarged front view of the vending machine shown in FIG. 1.

As shown in FIGS. 1 and 2, on the right side of a door 7 of each charge block 3, there is provided an operation panel 9 on which a block selection switch 10, a door open key 11, and four(4) charge time selection buttons 12, arranged vertically. The charge time selection buttons 12 are provided to set a charge time, which the mobile phone holder wishes.

More in detail, once the uppermost button of the charge time selection buttons 12 has been depressed, three (3) minutes of the charge time will be set; once the second button from the uppermost one has been depressed, five (5) minutes of the charge time will be set; once the third button 12 from the uppermost one has been depressed, ten(10) minutes of the charge time will be set; and once the lowermost button 12 has been depressed, fifteen(15) minutes of charge time will be set.

Above the door 7, there is arranged a charge lamp 14 indicating whether or not the block 3 is in a charging operation stand-by status, in a charging status, or in a charge completion status.

The door 7 is swingably connected to the left edge of each charge block 3 through upper and lower hinges 15. Inside the door 7, a phone storage room 16 in which the mobile phone will be attached is arranged in the charge block 3. When the door 7 is opened, the phone storage room 16 will be exposed.

The lock/unlock of the door 7 provided at the front opening 16a of the phone storage room 16 is accomplished by the key 11. The key 11 and a latch 13 which is provided to a central part of the side edge of the door 7 constitute a lock mechanism for locking/unlocking the door 7.

On the bottom of the phone storage room 16, there is provided a charge holder 17 on which a mobile phone with the secondary battery to be charged will be placed. Where the mobile phone is placed to the charge holder 17, two charge terminals equipped to the bottom of the secondary battery is set to be contacted (or electrically connected) to two electrodes of the charge holder 17 which are arranged on the bottom thereof.

Now, the description of the electric construction of the vending machine will be given with reference to FIG. 4.

Figure 4:
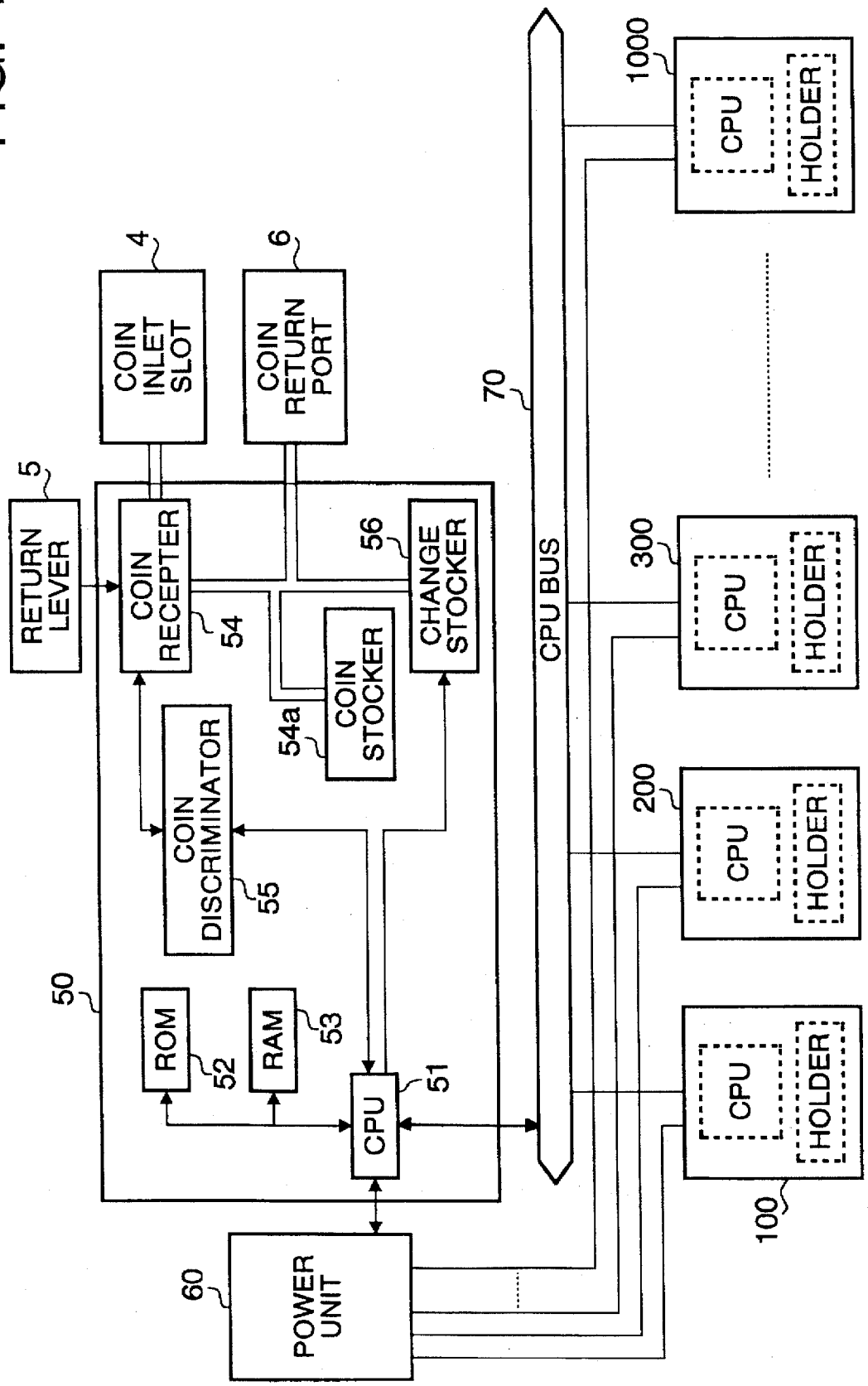
FIG. 4 is a block diagram showing an electrical construction of the vending machine shown in FIG. 1.

As shown in FIG. 4, the vending machine is provided with a main unit 50 for controlling the total operation of the machine and administrating the delivery and receipt of money, ten(10) charging units 100, 200, 300, ... 1000 corresponding to the ten(10) charging blocks 3, respectively, a power unit 60 for to supplying an electric power to the main unit 50 and all of the charging units 100, 200, 300, ... 1000, and CPU bus 70 for electrically and mutually connecting the main unit 50 and the charging units 100, 200, 300, ... 1000.

Accordingly, main unit 50 and the charging units 100, 200, 300, ... 1000 constitute a so-called master/slave relationship.

On the other hand, each of the charging units 100, 200, 300, ... 1000 has both a standby mode and an active mode, wherein the charging units normally remain on standby mode. On the standby mode, the electric power is supplied to one part of the construction, thereby limiting the consumption of the electric power by the vending machine. If it is necessary to execute a charging operation, the mode of the charging units 100, 200, 300 ... 1000 will be switched from the standby mode to the active mode under the control of the main unit 50.

It should be noted that the charging units 100, 200, 300 ... 1000 basically employ a common construction except for the shape of the holder to which the mobile phone is to be attached, position of the electrodes and a charging voltage, etc.

The aforesaid main unit 50 includes a CPU (central processing unit) 51 for controlling the total operation of the vending machine and administrating the delivery and receipt of money, a ROM 52 for storing a control program to be executed by the CPU 51, a RAM 53 to be used as a working area for the control program which is executed in the CPU 51, a coin receptor 54 for temporarily receiving the coin which has been inserted through the coin inlet slot 4, a coin stocker 54a for stocking the coin, a coin discriminator 55 for discriminating a truth/false of the coin inserted through the coin inlet slot 4, and a change stocker 56 for stocking coins for change.

The coin temporally stocked in the coin receptor 54 will be returned to the coin return port 6 when it is discriminated as a false coin, and an unacceptable (for example, a foreign) coin, or when the return lever 5 has been operated. If it is necessary to make change, the change will be discharge to the coin return port 6.

Next, the description of the charging unit 100 (200, 300 ... 1000) will be given with reference to FIG. 5.

The charging unit 100 is constructed in such a manner that it received a command from the CPU 51 of the main unit 70 through the CPU bus 70 thereby executing the charging operation.

Figure 5:
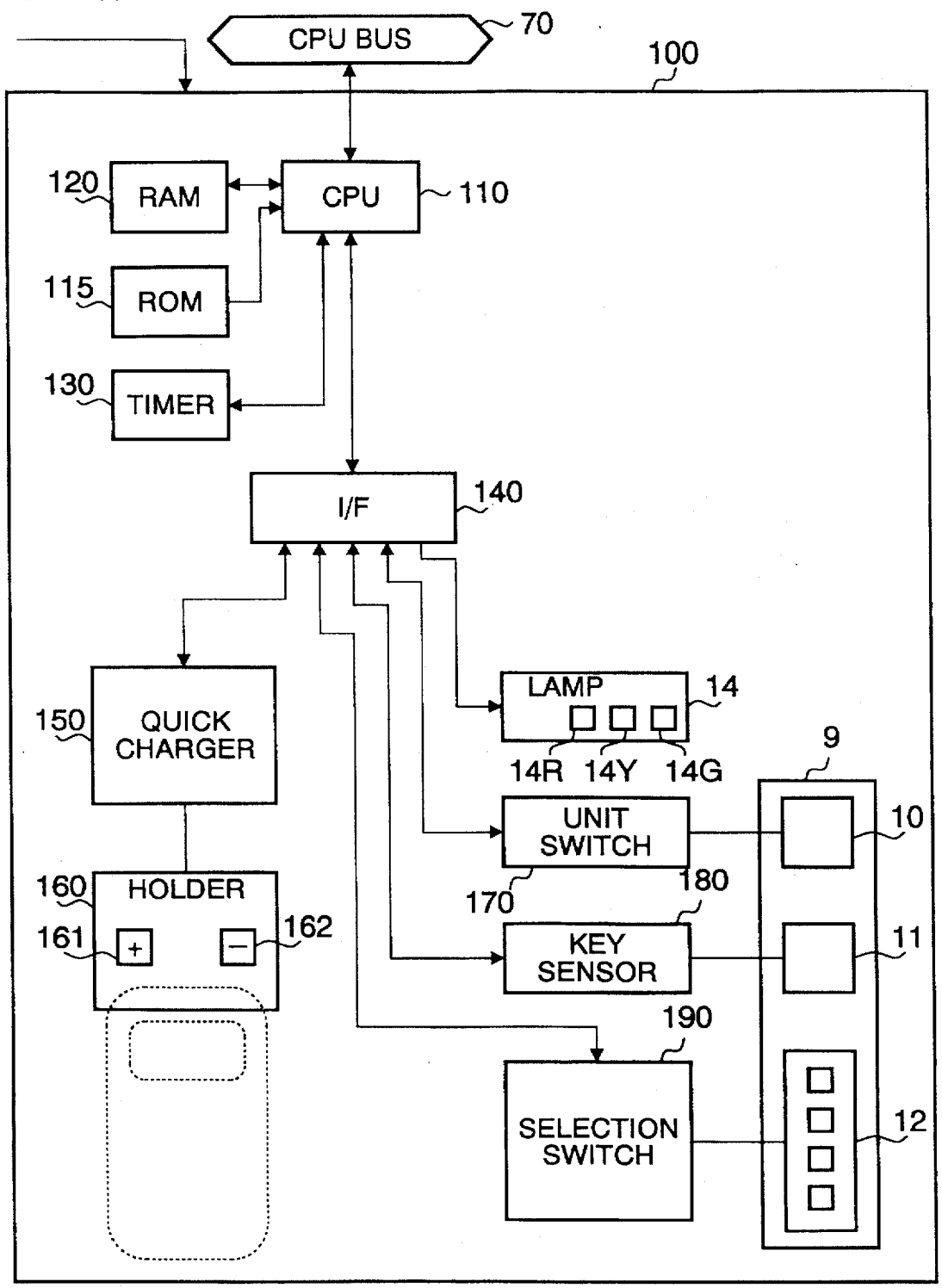
FIG. 5 is a block diagram showing an electrical construction of a charging unit 100.

As shown in FIG. 5, the charging unit 100 is constructed to include a CPU 110 for controlling the operation thereof, a ROM 115 for storing a control program to be executed by the CPU 110, a RAM 120 to be used as a working area for the control program which is executed in the CPU 110, a timer 130 for setting the charging time, an interface (I/F) 140 for electrically connecting the CPU 110 with a peripherals as described later, a quick charger 150 for charging the secondary battery of the mobile phone by means of a constant current system, a holder 160 to which the mobile phone is to be attached, a unit switch (SW) 170 for propagating the selection result from the charging block selection switch 10 to the CPU 110 through the interface (I/F) 140, a key sensor 180 for propagating the sensing result about the lock/unlock operation by the key 11 to the CPU 110 through the interface (I/F) 140, a selection switch 190 for propagating the charging time selected by the charging time selection buttons 12 to the CPU 110 through the interface (I/F) 140 and the charging lamp 14 for displaying the charging condition.

The charging lamp 14 includes a green LED (light emitting device) 14G for emitting a green color light, yellow LED 14Y for emitting a yellow color light and a red LED 14R for emitting a red color light. These LEDs are set to light according to the transition of the charging operation.

The holder 160 is provided with at least a positive (+) electrode 161 and a negative (−) electrode 162 which are set to be contacted or electrically connected to two terminals of the secondary battery of the mobile phone, respectively, when the mobile phone is attached to the holder 160.

Actually, as a secondary battery, there are many sorts of battery such as a nickel-cadmium (Ni—Cd) battery, a nickel-metalhydride (Ni—MH) battery and a lithium-ion (Li-ION) battery, and there are several operational or discharge voltages of the mobile phone such as 3.0 (V), 3.6 (V), 6.0 (V), and 7.2 (V), etc.

Additionally, the secondary battery is attached to the mobile phone in a form of a battery package with 3.6(V) where three (3) Ni—Cd battery cells, a nominal voltage of each of which is set to be 1.2 (v), are connected in a series; or a battery package with 3.6 (V) where a single Li-ION battery cell, a nominal voltage of which is set to be 3.6 (V), is connected; or a battery package with 7.2 (V) where two(2) Li-ION battery cells are connected in a series. In the battery package, a protection circuit is usually provided so that the charging voltage thereof is set to be relatively high, for example, 5.5 (V) even though the discharge voltage thereof is set to be 3.6 (V).

Furthermore, positions of the electrodes 161 and 162, the shape of each of the electrodes 161 and 162 are uniquely defined according to a specification of the mobile phone, the type of the secondary battery of the mobile phone.

For these reasons, the position and shape of the electrodes in the holder 160 and the charging voltage and the charging current in the quick charger 150 are set to conform to the specification of the secondary battery or the battery package attached to the specific mobile phone. Accordingly, the position and shape of the electrodes and the charging voltage and current are different for each charging units, however, the electric construction and the charging system of the quick charger 150 is common to the other quick charger.

Next, the detailed description of the quick charger 150 will be given with reference to FIG. 6. The quick charger 150 is constructed so as to execute charging control with the constant current system.

Figure 6:
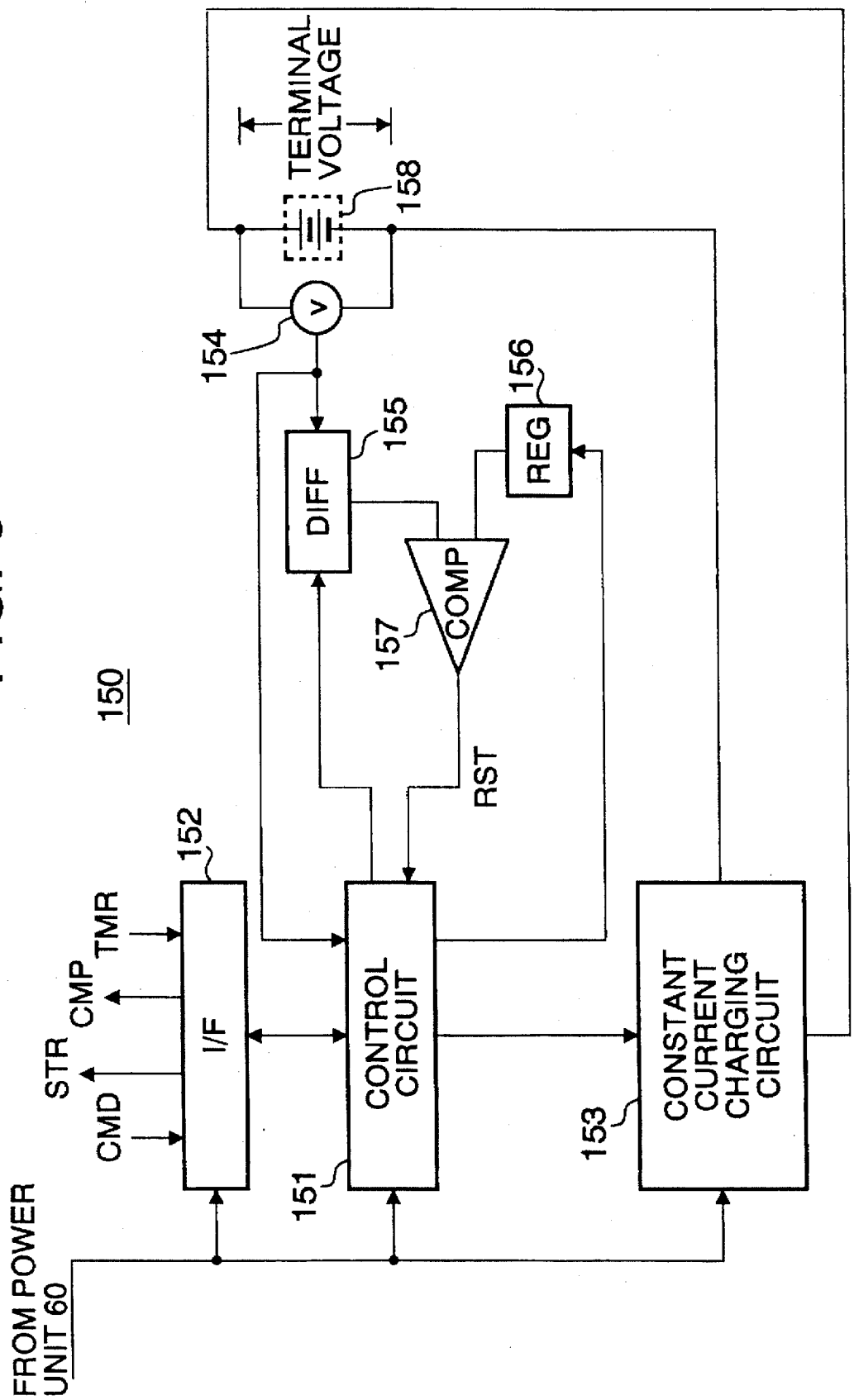
FIG. 6 is a block diagram showing an electrical construction of a quick charger 150.

As shown in FIG. 6, the quick charger 150 includes a control circuit 151 for controlling the charging operation, an interface (I/F) 152 for inputting and outputting control signals for communicating between the control circuit 151 and the CPU 110, a constant current charging circuit 153 for charging the secondary battery with the constant current, a voltmeter 154 for measuring the terminal voltage (V) of the secondary battery, a differentiation circuit (DIFF) 155 for measuring a change rate in time (dV/dt) of the terminal voltage, a register (REG) 156 in which a threshold value (TH) to be utilized to compare the change rate in time (dV/dt) is set and stored, and a comparator (COMP) 157 for comparing the change rate in time (dV/dt) with the threshold value (TH).

Also, as shown in FIG. 5, a reference numeral 158 indicates the secondary battery to be charged, a reference character CMD denotes a charging start command signal from the CPU 110, STR shows a charging start notification signal to the CPU 110 and CMP designates a charging completion signal to CPU 110.

The comparator (COMP) 157 is set to output a comparison result signal (RST) as the value thereof is "1" in a case where the change rate of time (dV/dt) is equal to the threshold value (TH), that is, dV/dt=TH, while output the RST as the value thereof is "0" in a case where the change rate of time (dV/dt) is larger that the threshold value (TH), that is, dV/dt>TH. If the value of a timer signal (TMR) is "1", this indicates that the charging time selected by the charging time selection buttons 12 has not yet reached time-out condition. On the other hand, if the value of the TMR is "0", this indicates that the charging time reached the time-out condition.

Figure 7:
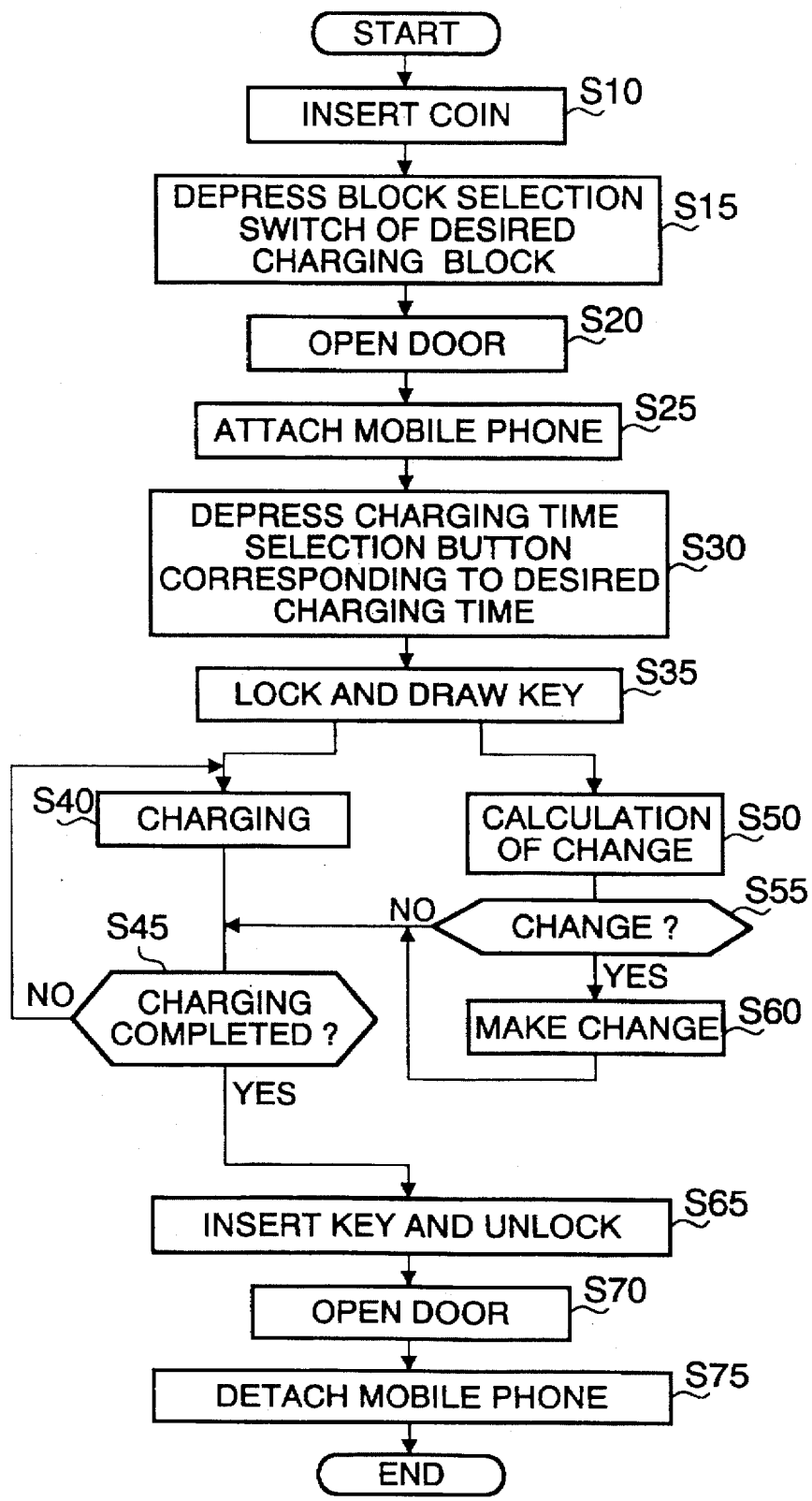
FIG. 7 is a flow chart showing a general operation procedure for the vending machine.

Next, the brief description of the operation of the vending machine will be given with reference to flow charts of FIGS. 7 through 10. FIG. 7 shows a flowchart of the summary of the operation of the vending machine in view of an operation of the mobile phone holder, basically.

As shown in FIG. 7, the mobile phone holder inserts a coin through the coin inlet slot 4 in a step S10, and search for the charging block 3 suitable for charging the secondary battery of the mobile phone he or she possesses. Then, the mobile phone holder depresses the charging block selection switch 10 of the charging block 3, which he or she desires, from all switches 10 in a step S15. Thereafter, The mobile phone holder opens the door 7 of the corresponding charging block 3 in a step S20, attaches the mobile phone to the charging holder 17 of the corresponding charging block 3 in a step S25, and depresses a charging time selection button 12, which corresponds to the charging time he or she desires and which is allowed in view of amount of money of the coin inserted through the slot 4 in a step S30.

The mobile phone holder closes the door 7 and then locks the door 7 by key 11 in a step S35. When the door 7 is locked, the charging operation is started in a step S40. Note that if the mobile phone holder temporally leaves the vending machine during the charging operation, the key 11 may be taken along.

When the door 7 is locked by the key 7 in the step S35, a calculation of a change is executed in a step S50, based on an amount of money of the coin which has been inserted through the slot 4 and the charging time selected by the selection switches 12 while the charging operation is started concurrently in the step S40. The detail of the change calculation will be described with reference to FIG. 9.

Note that a term for calculation of the change is shorter than that for the charging operation. Accordingly, if it is determined that there is no change in a step S55 after the change calculation, the process will go to a step S45 to detect whether or not the charging operation is to be halted or completed. On the other hand, if it is determined that there is a change in the step S55, the process will go to a step 60 to make change and discharge the change to the coin return port 6, and go to the step S45, and then wait for the completion of the charging operation in the step S40.

In the step S45, when it is determined that the charging operation is completed or halted, the process will go to a step S65 for insertion of the key 11 and unlocking of the door 7. Then, the door 7 is opened in a step S70 and finally the mobile phone with the secondary battery of which the charging operation is completed is detached from the holder 17 in a step S75.

Figure 8:
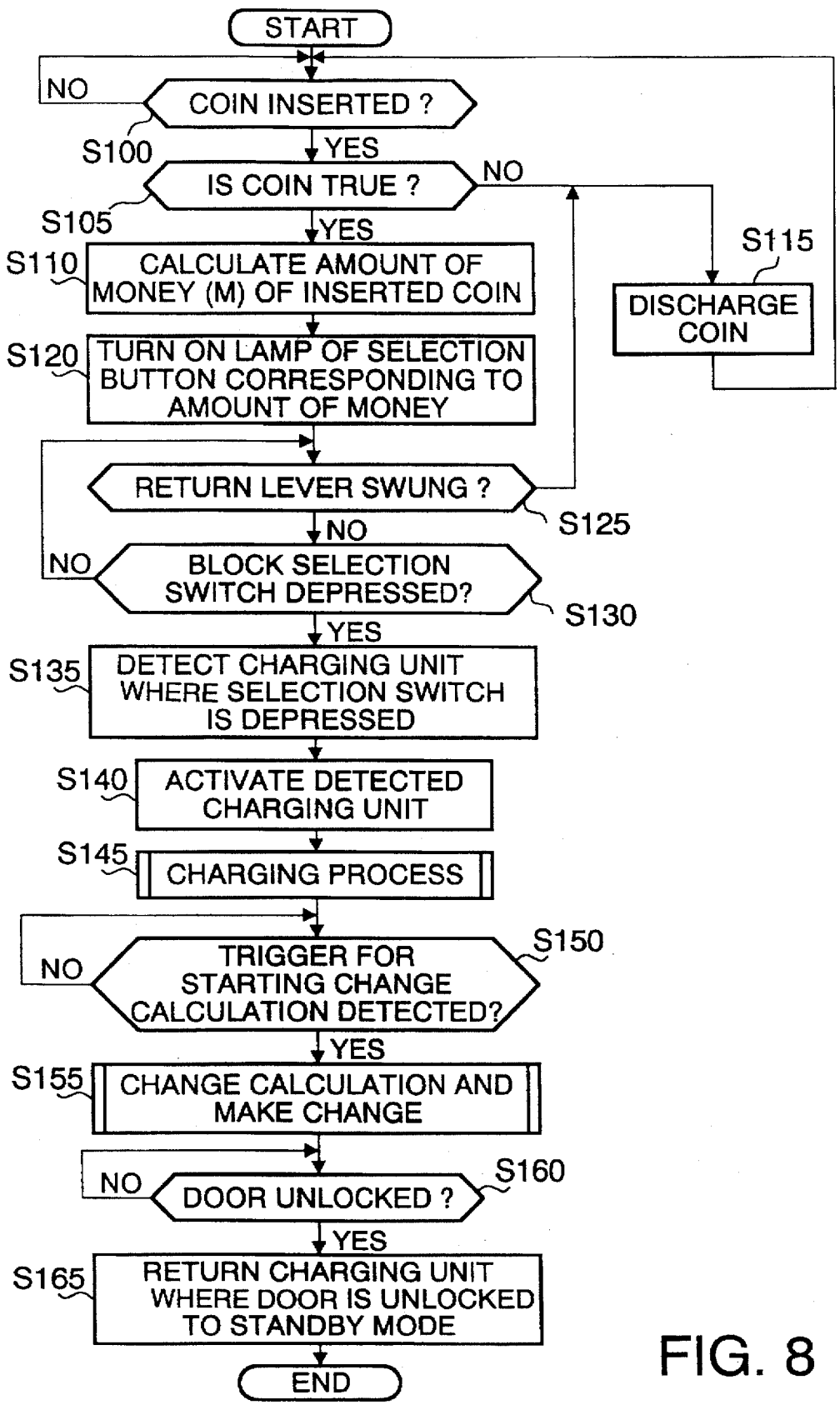
FIG. 8 is a flow chart describing an operation of a main unit 50 of the vending machine.
Figure 9:
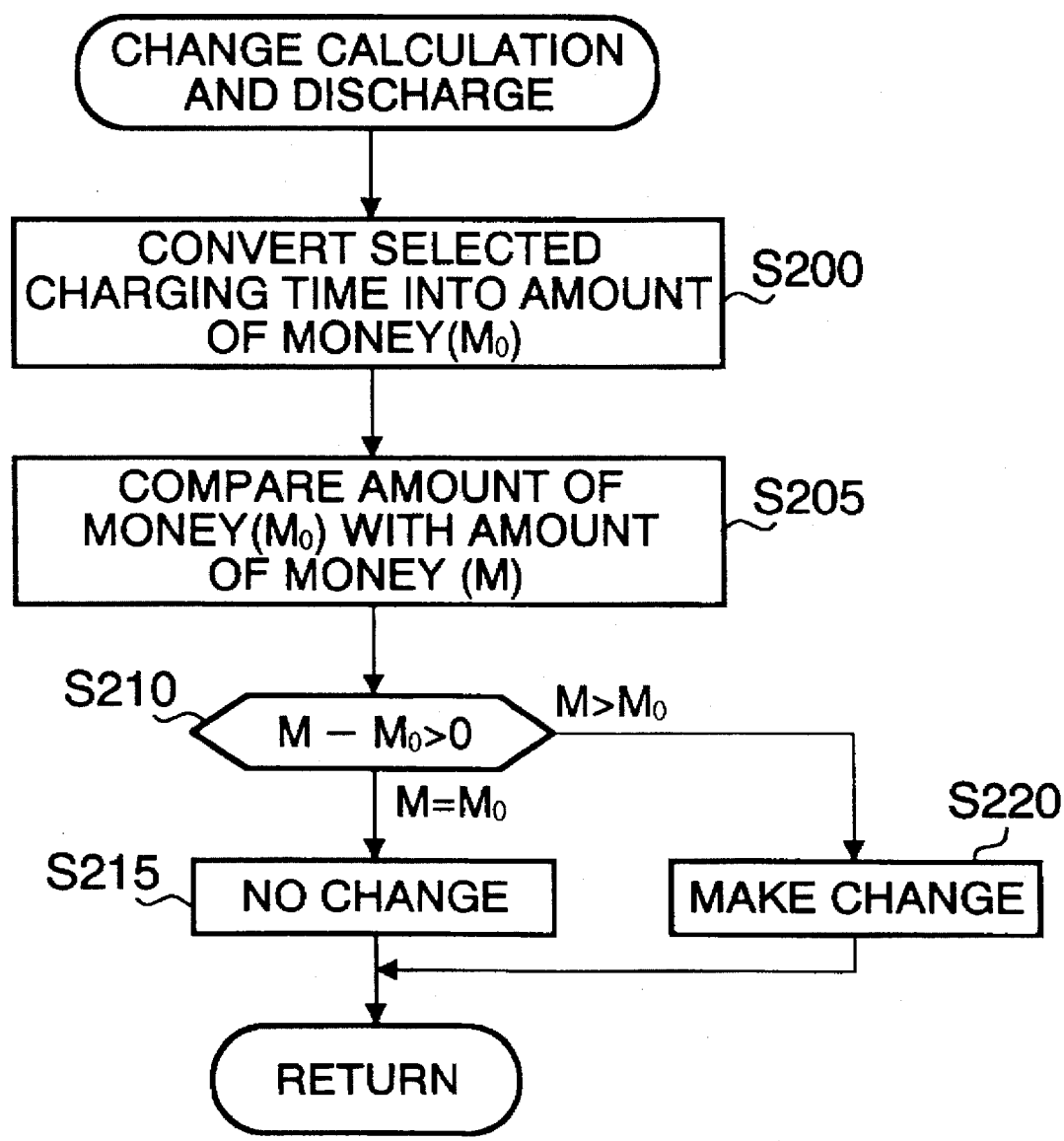
FIG. 9 is a flow chart describing a change calculation processing executed in the main unit 50.
Figure 10:
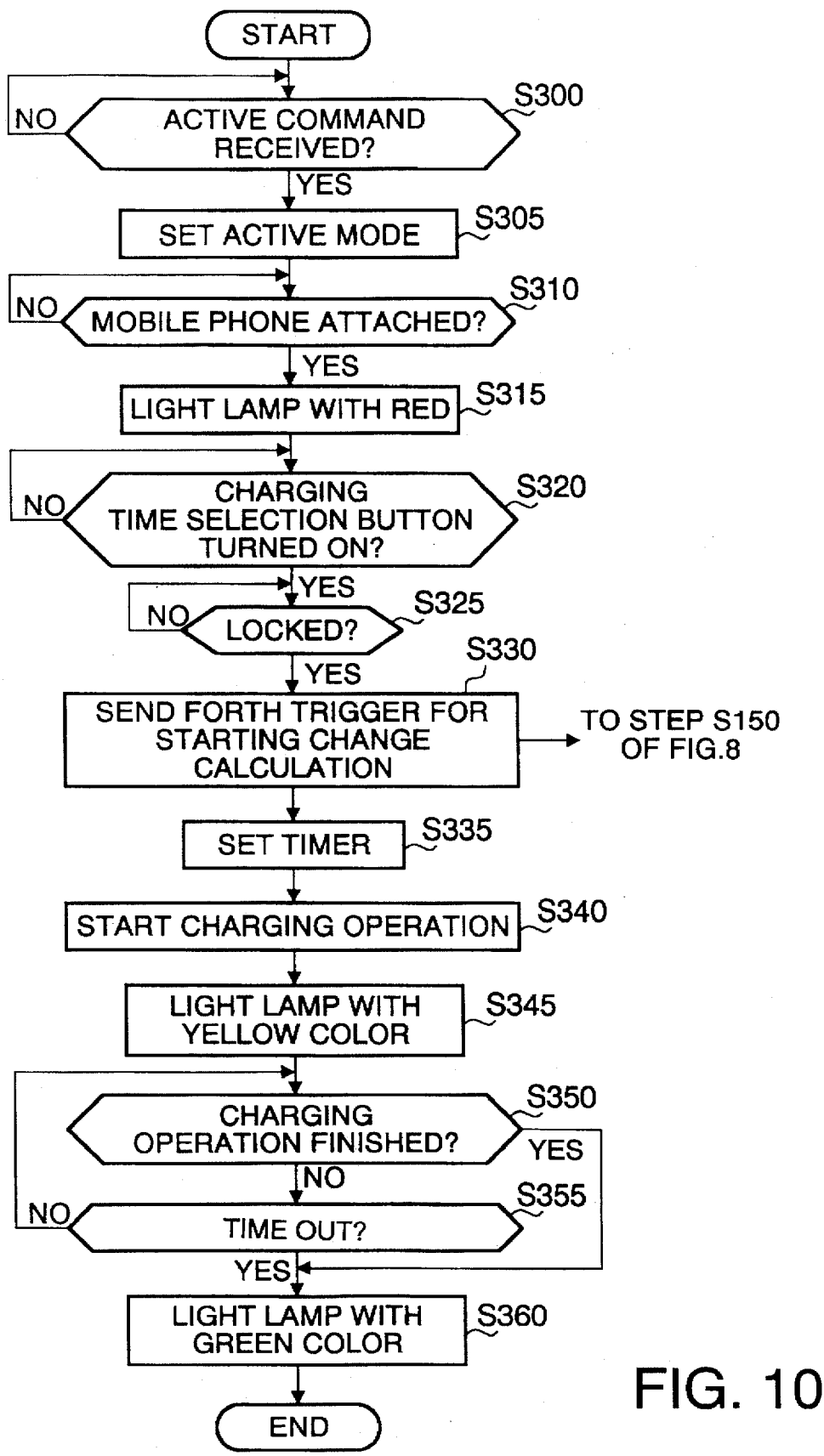
FIG. 10 is a flow chart describing a charging operation in a charging unit 100.

Hereinafter, the detailed description of the operation of each component of the vending machine will be given with reference to flow charts of FIGS. 8 through 10. FIG. 8 is a flowchart for showing the operation of the main unit 50 of the vending machine, FIG. 9 is a flowchart for describing the operation of the change, and FIG. 10 is a flowchart for showing the charging operation in the charging unit.

In the main unit 50, at first, it is waited for inserting the coin in a step S100 as shown in FIG. 8. If it is determined that the coin is inserted through the coin inlet slot 4, it is determined that whether the coin is true or false by the coin discriminator 55 in a step S105. When it is determined that the coin is true in the step S105, the process will go to a step S110. On the other hand, when it is determined that the coin is false or unacceptable in the step S105, the process will go to a step S115 to return the coin to the coin return port 6 and then return to the step S100.

In the step S110, the amount of money (M) which has been inserted through the slot 4 is calculated. Then, certain lamps, which correspond to the amount of money of the inserted coin(s), among all lamps which are provided for all the charging time selection buttons 12 are turned on in a step S120. For example, suppose that the four(4) selection buttons 12 correspond to 5, 10, 15 and 30 minutes, respectively, and these four(4) charging time charges correspond to 50, 100, 150, 300 yens, respectively. If one coin for 50 yens is inserted, the lamp corresponding to 5 minutes is only turned on among all the lamps, while if 150 yens are inserted, the lamps corresponding to 5, 10 and 15 minutes are turned on among all the lamps.

After the step S120, it is detected that whether or not the return lever 5 is operated in a step S125. If it is determined that the return lever 5 is operated in the step S125, the process will return to the step S115 to return the coin to the return port 6. On the other hand, if it is determined that the return lever 5 is not operated in the step S125, the process will go to a step S130.

In the step S130, it is detected whether or not anyone of the charging block selection switches 10 is depressed. If it is determined that none of the switches 10 is depressed in the step S130, the process will return to the step S125. On the other hand, if it is determined that one of the switches 10 is depressed in the step S130, the process will go to a step S135 to detect that which is the charging block 3 where the selection switch 10 is depressed. Then, the charging unit 100 of the charging block 3 detected in the step S130 is caused to be activated, that is, set in the active mode in a step S140.

Then, the charging operation is executed in the charging unit 100 in the active mode in a step S145. The detail of the charging operation will be described later with reference to FIG. 10.

After the step S145, it is waited that a start trigger signal for the change calculation, which will be described later in detail, is received in a step S150. If it is determined that the start trigger signal is received in the step S150, the process will go to a step S155 to execute the change calculation and the change discharge.

Now, the detailed description of the operation of the change calculation and the change discharge in the step S155 will be given with reference to flow chart of FIG. 9.

As shown in FIG. 9, an amount of money (Mo) is determined from the charging time selected by the charging time selection buttons 12 in a step S200. For example, if the button 12 for indicating 15 minutes of the charging time is selected, the amount of money (Mo) is set to be 150 yens (Mo=150 yens). Then, a comparison between the converted amount of money (Mo) and the inserted amount of money (M) in a step S205 is made. Then, it is determined whether or not M−Mo>0 in a step S210.

If it is determined that the inserted amount of money (M) is equal to the converted amount of money (Mo) (that is, M=Mo) in the step S210, the process will go to a step S215 to determine that there is no change and then return to the main routine shown in FIG. 8. On the other hand, if it is determined that the inserted amount of money (M) is larger than the converted amount of money (Mo) (that is, M>Mo), the difference between M and Mo is defined as a change and make change or discharge the change from the change stocker 56 to the coin return port 6 in a step S220 and then the process will return to the main routine shown in FIG. 8.

As shown in FIG. 8 again, it is waited that the door 7 is unlocked in a step S160. More specifically, in the step S160, it is waited for receiving a door open signal from the charging unit 100 now on use in the CPU 51. If it is determined that the door 7 is unlocked in the step S160, the process will go to a step S165 to return the mode of the charging unit 100, the door 7 of which is unlocked, from the active mode to the stand-by mode. In this time, the charging lamp 14 is turned off.

In the aforementioned processes, the main unit 50 can execute the processes of the steps S135 to S165 for a plurality of charging units 100 (200, 300, . . . 1000) in parallel.

Next, the description of the charging operation of one of the charging units will be given with reference to flowchart of FIG. 10. It is a matter of course that the same charging operation will be executed in another charging units. The charging unit 100 is set to be usually in the stand-by mode as mentioned above and waiting for receiving the active command from the CPU 51 of the main unit 50.

At first, it waits to receive the active command from the CPU 51 in a step S300. When it is determined that the active command is received from the CPU 51 in the step S300, the process will go to a step S305 to cause the charging unit 100 be in the active mode. Accordingly, the electric power is supplied to each component of the charging unit 100 thereby being enable condition (status) for charging operation.

Then, it waits for the mobile phone to be attached to the holder 160 in a step S310. When it is determined that the mobile phone is correctly attached to the holder 160 and two electrodes of the secondary battery equipped to the mobile phone are contacted to the terminals 161 and 162, respectively, the process will go to a step S315 to turn on the red LED 14R of the charge lamp 14. Accordingly, the mobile phone holder is informed that the preparation of the charging operation is completed.

Then, it waits for anyone of the charging time selection buttons 12 to be depressed in a step S320. When it is determined that one of the selection buttons 12 is depressed in the step S320, the process will go to a step S325 to wait that the door 7 is locked by the key 11. When it is determined that the door 7 is locked in the step S325, the key sensor 180 detects this lock and the process will go to a step S330 to send forth the start trigger signal for the change calculation to the CPU 51 of the main unit 50. Accordingly, it starts to calculate the change in the main unit 50, as indicated in the step S155 shown in FIG. 8.

Then, the charging time is set in accordance with the selection by the selection button 12 in a step S335. The charging operation is started by the quick charger 150 in a step S340. Furthermore, the charging lamp 14 is switched from the lighting of the red LED 14R to the lighting of the yellow LED 14Y in a step S345. Accordingly, it informs the mobile phone holder that the charging operation is now being executed or the secondary battery is now being charged.

Then, it waits for the completion of the charging operation or the charging time set on the timer to be expired in steps S350 and S355. When it is determined that the charging operation is completed or the charging time has expired, the process will go to a step S360. The charging lamp 14 is switched from the lighting of the yellow LED 14Y to the lighting of the green LED 14G in the step S360. Accordingly, it informs the mobile phone holder that the charging operation for the secondary battery of the mobile phone is halted or completed.

Next, the description of the charging operation of the quick charger 150 will be given with reference to the charging characteristics of the secondary battery shown in FIGS. 11A, 11B and 12 and the flowchart of FIG. 13.

At first, the charging characteristics of the secondary battery will be described.

Figures 11A, 11B:
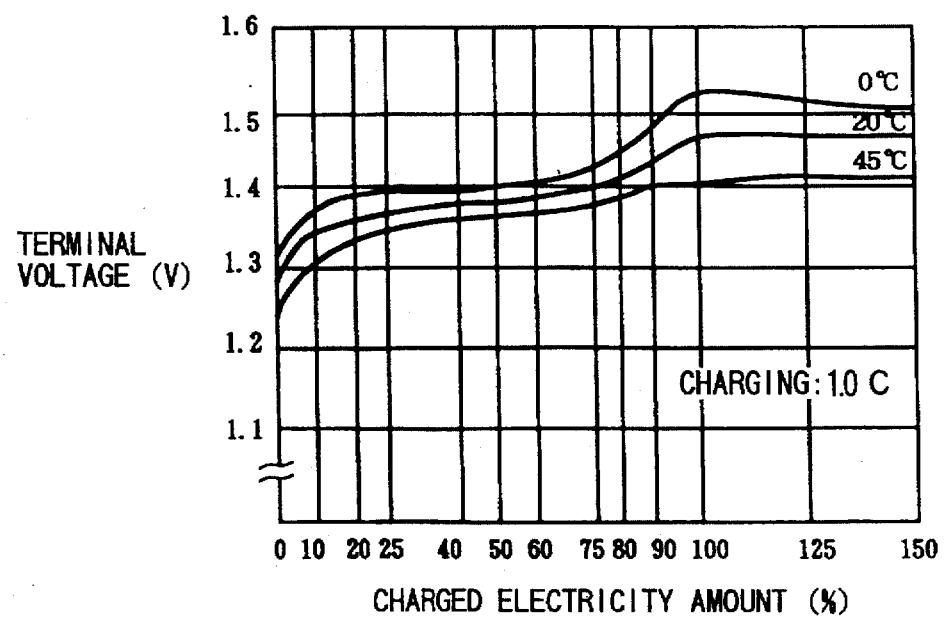
FIGS. 11A and 11B are a chart and a graph, each showing a charging characteristics of a Ni—Cd battery or Ni—MH battery.

FIGS. 11A and 11B show a table and a graph, respectively, each for indicating the charging characteristics of the alkali-secondary battery such as Ni—Cd or Ni—MH battery with a nominal voltage of 1.2 (V). Note that these figures are shown in Japanese Patent Publication Laid-Open No. 7-312229.

From FIGS. 11A and 11B, it is seen that the battery voltage (that is, terminal voltage) will be suddenly raised up from a termination voltage (about 1.2 to 1.3 (V)) around a region near substantially 0% of a charged electricity amount according to the elapse of the charging time. The charged electricity amount will increase according to the elapse of the charging time and then the change rate in time of the battery voltage will be decreased.

Then, the change rate in time of the battery voltage will be substantially zero(0) around a region near substantially 60% of the charged electricity amount. Furthermore, the battery voltage of the secondary battery will increase again according to the further increase of the charged electricity amount. Finally, the battery voltage will saturate at a predetermined value when the charged electricity amount exceeds 100% and then decrease a little. It should be noted that it will require about 35 minutes for 60% charging condition (that is, 60% of the charged electricity amount).

Figure 12:
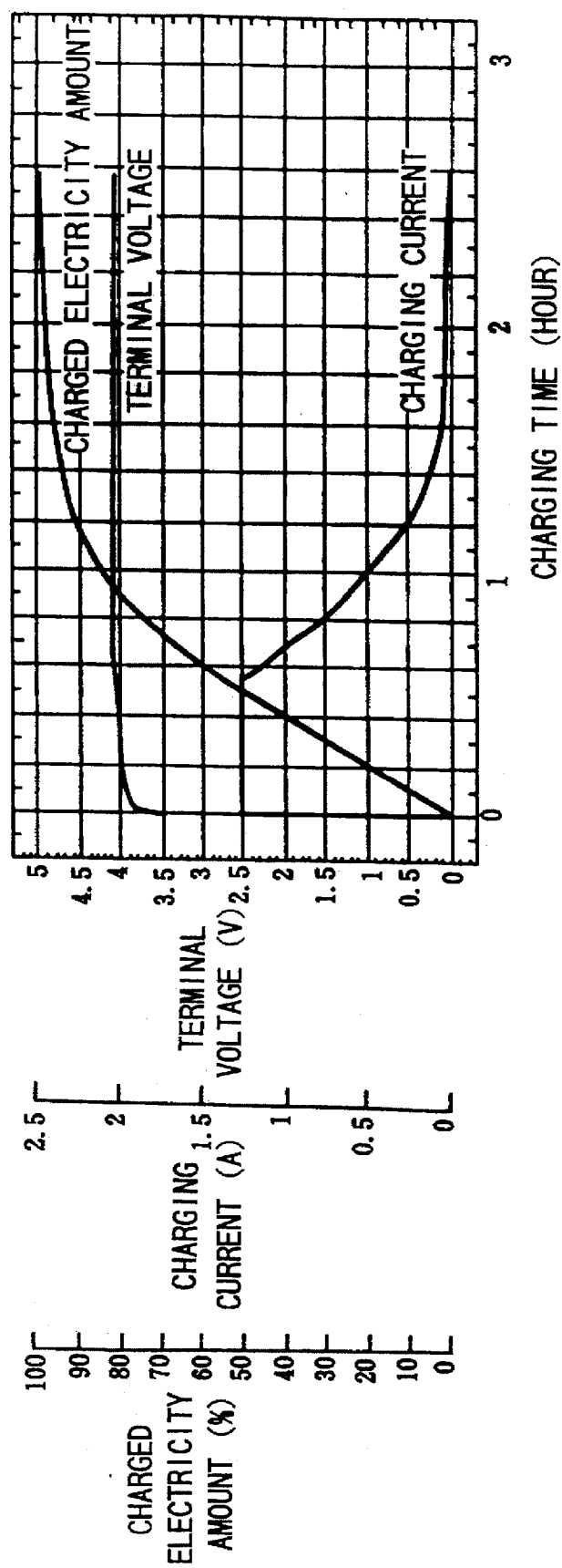
FIG. 12 is a graph showing a charging characteristics of Li-ION battery.
Figure 13:
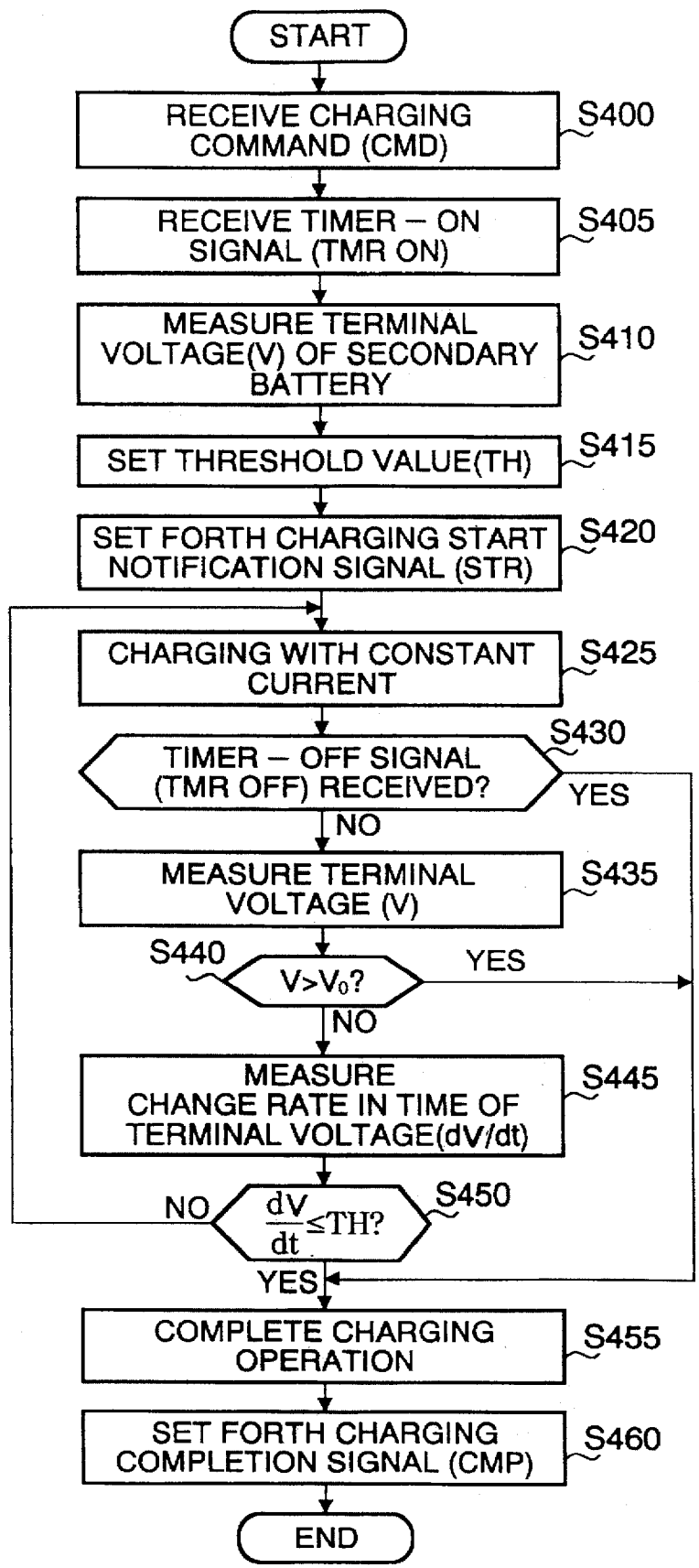
FIG. 13 is a flow chart describing a charging operation of the quick charger 150 shown in FIG. 6.

FIG. 12 indicates the charging characteristics of the Li-ION secondary battery with a nominal voltage of 3.6 (V) where it is charged by a constant current/constant voltage charging system, disclosed by "NIKKEI ELECTRONICS", on page 108, issued on Nov. 28, 1995.

From FIG. 12, it is seen that the battery voltage will be suddenly raised up from a termination voltage (for example, about 2.5 to 3.2 (V)) around a region near substantially 0% of a charged electricity amount according to the elapse of the charging time. The charged electricity amount will increase according to the elapse of the charging time and then the change rate in time of the battery voltage will be decreased.

Then, it will be seen that the charged electricity amount will reach about 60% at a timing when the charging system is switched from the constant current system to the constant voltage system, that is, the terminal voltage of the secondary battery reaches the predetermined charged voltage (for example, about 4.1 to 4.2 (V)) and the change rate in time of the terminal voltage becomes to be very small (or near to zero(0)) It should be noted that it will require about 36 minutes for 60% charging condition (that is, 60% of the charged electricity amount).

From the above description, it is necessary to watch the terminal voltage of the secondary battery on charging and the change rate in time of the terminal voltage thereof if 60% of charging should be substantially accomplished even though the secondary battery is Ni—Cd battery or Ni—MH battery or Li-ION battery. When the terminal voltage reaches the predetermined charging voltage or the change rate in time of the terminal voltage becomes very small, the charging operation should be halted.

Note that it is unnecessary in the present embodiment to accomplish the conventional precise control to charge the secondary battery in order to prevent the secondary battery from producing fire and/or fuming due to the overcharge to the secondary battery since only enough charge to the secondary battery of about 60% is provided. Accordingly, in the present embodiment, the construction of the charging circuit would be advantageously simpler than that of a conventional one.

Next, the description of the charging control procedure in the control circuit 151 of the quick charger 150 which utilizes the line of thinking described just above will be given with reference to the flowchart of FIG. 13. Here, it is assumed that the mobile phone with the secondary battery is correctly attached to the holder 160 and the two electrodes of the secondary battery are contacted or electrically connecting to two terminals 161 and 162 of the holder 160. Furthermore, it is assumed that a battery indicator of the mobile phone indicates that the electric power of the secondary battery is completely consumed and that the terminal voltage of the secondary battery has dropped to the termination voltage, in the following control procedure.

The control circuit 151 receives the charging start command signal (CMD) from the CPU 110 through the interface (I/F) 152 in a step S400 and then receives the timer signal (TMR), the value of which is set to "1", that is, a timer-on (TMR-ON) signal, from the CPU 110 in a step S405.

After the step S405, the terminal voltage of the secondary battery which is attached to the holder 160 is measured as an initial value in a step S410 and then the threshold value (TH) is set to the register (REG) in a step S415. It should be noted that the threshold value (TH) is very small, near zero(0), and stored in ROM of the control circuit 151 with considering to the sort of the secondary battery which is capable of being charged by the quick charger 150 and its charging characteristics. The charging voltage (Vo) of the secondary battery is also stored in the ROM.

The control circuit 151 sends forth the charging start notification signal (STR) to the CPU 110 in a step S420. Note that the CPU 110 controls the yellow LED 14Y of the charging lamp 14 to be turned on for indicating that it is executing the charging operation, upon receiving the signal (STR).

The control circuit 151 then controls the constant current charging circuit 153 to start the charging of the secondary battery with the constant current in a step S425. In a following step S430, it is detected that whether or not the timer signal (TMR), the value of which is set to "0", that is, timer-off (TMR-OFF) signal, is received from the CPU 110. In other words, in the step S430, it is determined whether or not a time-out notice is issued by the CPU 110. When it is determined that the timer-off (TMR-OFF) signal is received from the CPU 110 in the step S430, the process will go to a step S455 to halt or complete the charging operation. On the other hand, when it is determined that the timer-off (TMR-OFF) signal is not received from the CPU 110 in the step S430, the process will go to a step S435.

In the step S435, the terminal voltage (V) of the secondary battery is measured by means of the voltmeter 154. Then, it is determined whether or not the measured terminal voltage (V) exceeds a charged voltage (Vo) defined for the secondary battery in a step S440. When it is determined that the measured terminal voltage (V) is larger than the charged voltage (Vo), that is, V>Vo in the step S440, the process will go to the step S455 to halt the charging operation.

On the other hand, when it is determined that the measured terminal voltage (V) is equal to or smaller than the charged voltage (Vo), that is, V≦Vo in the step S440, the process will go to a step S445. In the step S445, a change rate in time (dV/dt) of the terminal voltage (V) is measured by means of the differentiation circuit (DIFF) 155. Then, the comparator (COMP) 157 compares the change rate in time (dV/dt) with the threshold value (TH) set in the register (REG) 156 in a step S450.

If it is determined that the change rate in time (dV/dt) is larger than the threshold value (TH) in the step S450, the process will return to the step S425 to continue the charging operation since the terminal voltage (V) still continues to raise up and the charged electricity amount has not reached the 60% point.

If it is determined that the change rate in time (dV/dt) is equal to or smaller than the threshold value (TH) in the step S450, the process will go to the step S455 to halt the charging operation in the constant current charging circuit 153 since the terminal voltage (V) stops to raise up and the charged electricity amount has reached 60%.

Finally, the control circuit 151 sends forth the charging completion signal (CMP) to the CPU 110 to complete the charging operation in a step S460. Note that the CPU 110 controls the green LED 14G of the charging lamp 14 to be turned on for indicating that the charging operation has been completed, upon receiving the signal (CMP).

It should be noted that the term "completion of charging" does not mean 100% charged condition (or full charged condition) but means about 60% charged condition, in the present embodiment.

It should be further noted that the vending machine according to the present invention may be placed in any public places, such as station precincts, underground markets, hotels, and shopping centers, etc.

According to the present embodiment, even though the charge of a secondary battery of the mobile phone has been completely or partially consumed and unable to be used, the mobile phone holder can charge the secondary battery outdoors, using the vending machine of the present invention installed in public places.

Further in the present embodiment, it is possible to halt the charging operation even if the charging condition of the secondary battery has not reached the full charged condition but to about 60% charged condition, by monitoring the terminal voltage (V) of the secondary battery and the change rate in time of the terminal voltage (dV/dt), and comparing these values with the predetermine value or threshold value. Accordingly, it is unnecessary in the present embodiment to accomplish the conventional precise control to charge the secondary battery in order to prevent the secondary battery from producing fire and/or fuming due to the overcharge to the secondary battery since it is charged to about 60% of the full-charge electricity amount. Accordingly, in the present embodiment, the construction of the charging circuit can be advantageously simpler than that of a conventional one.

Still further in the present embodiment, the charging operation may be halted when it is determined that the charged electricity amount of the secondary battery has reached about 60% by monitoring the accumulated charged energy from the terminal voltage (V) of the secondary battery now on charged, the change rate in time (dV/dt) of the terminal voltage (V), the charging current in the constant current charging circuit 153 and the charging time, wherein if the secondary battery to be charged is a type in which the terminal voltage will fall to the termination voltage when the secondary battery is completely consumed or discharged by 100%.

Furthermore in the present embodiment, the positions and shape of the electrodes of the holder 160, the charging voltage and charging current in the quick charger 150 are conforming to the specification of the secondary battery or battery package equipped to the specific mobile phone. Accordingly, it is possible to experimentally determine the relationship between the charged voltage and the charged electricity amount by obtaining the charging characteristics of the secondary battery or battery package to be equipped to the mobile phone by an experimental method. If it is possible to experimentally obtain the relationship between the charged voltage and the charged electricity amount, the charging operation may be halted when it is determined that the terminal voltage reaches a predetermined value which is set to be lower than the maximum charged voltage defined for the secondary battery (e.g., a limited voltage) by only detecting or monitoring the terminal voltage of the secondary battery. In this case, it is preferred to halt the charging operation when it is determined that the terminal voltage measured by the voltmeter reaches approximately 60% to 90% of the maximum charged voltage defined for the secondary battery.

Accordingly, the mobile phone holder can charge the secondary battery which has been completely or partially consumed such that it is unusable, by using the vending machine of the present invention, placed in public spaces in a short time or easily, even though it is not charged 100%. It is possible to urgently use the mobile phone even though the secondary battery has not been fully or 100% charged, in a condition where the mobile phone holder does not have a replacement secondary battery.

From the description above, the present invention has an advantage that the mobile phone holder can lightheartedly use the mobile phone or charge the discharged secondary battery without possessing a replacement secondary battery, using the vending machine according to the present invention, settled in many places such as public places.

It should be noted that the quick charger employs a constant current charging system, however the present invention is not limited to employ such a constant current charging system but may employ a variable current charging system wherein a magnitude of the charging current is increased according to a charging time elapses in order to avoid a bad influence to the secondary battery by the quick charging operation. In this case, the magnitude of the charging current is applied to the secondary battery in an initial stage of the charging operation, then is gradually raised up in a mid stage thereof, and raised up to a high value in a final stage thereof.

Further, it is very advantageous in the present embodiment wherein a basic design of an electric circuit in the quick charger can be standardized over different types of secondary battery to be charged although the charging voltage (Vo), the charging current and the threshold value (TH) for watching the change rate in time (dV/dt) of the terminal voltage must be set differently according to the type of the secondary battery or the battery package.

On the other hand, it is required that the vending machine should correspond to many types of mobile phones or secondary batteries. According to the present invention, it is very advantageous to the vending machine because the basic design of the quick charger can be standardized over different types of secondary batteries, thereby contributing to reduce a manufacturing and/or developing cost of the vending machine.

Having described a specific embodiment of the vending machine, the present invention is not limited to the embodiment and it is believed obvious that modification and variation of the present invention is possible in light of the spirit and scope of the present invention.

It should be noted that, in the present embodiment, the vending machine is provided for charging the mobile phone. The present invention, however, is not limited to such an application but may charge the secondary battery for other portable electric devices, such as an electric notebook, a laptop-type personal computer and a portable facsimile device, etc.

Still further in the present embodiment, the door 7 is locked/unlocked by means of the key 11. The present invention, however, is not limited to such a construction but may lock/unlock the door 7 by means of an electric key as described later as one modification of the preferred embodiment.

Figure 14:
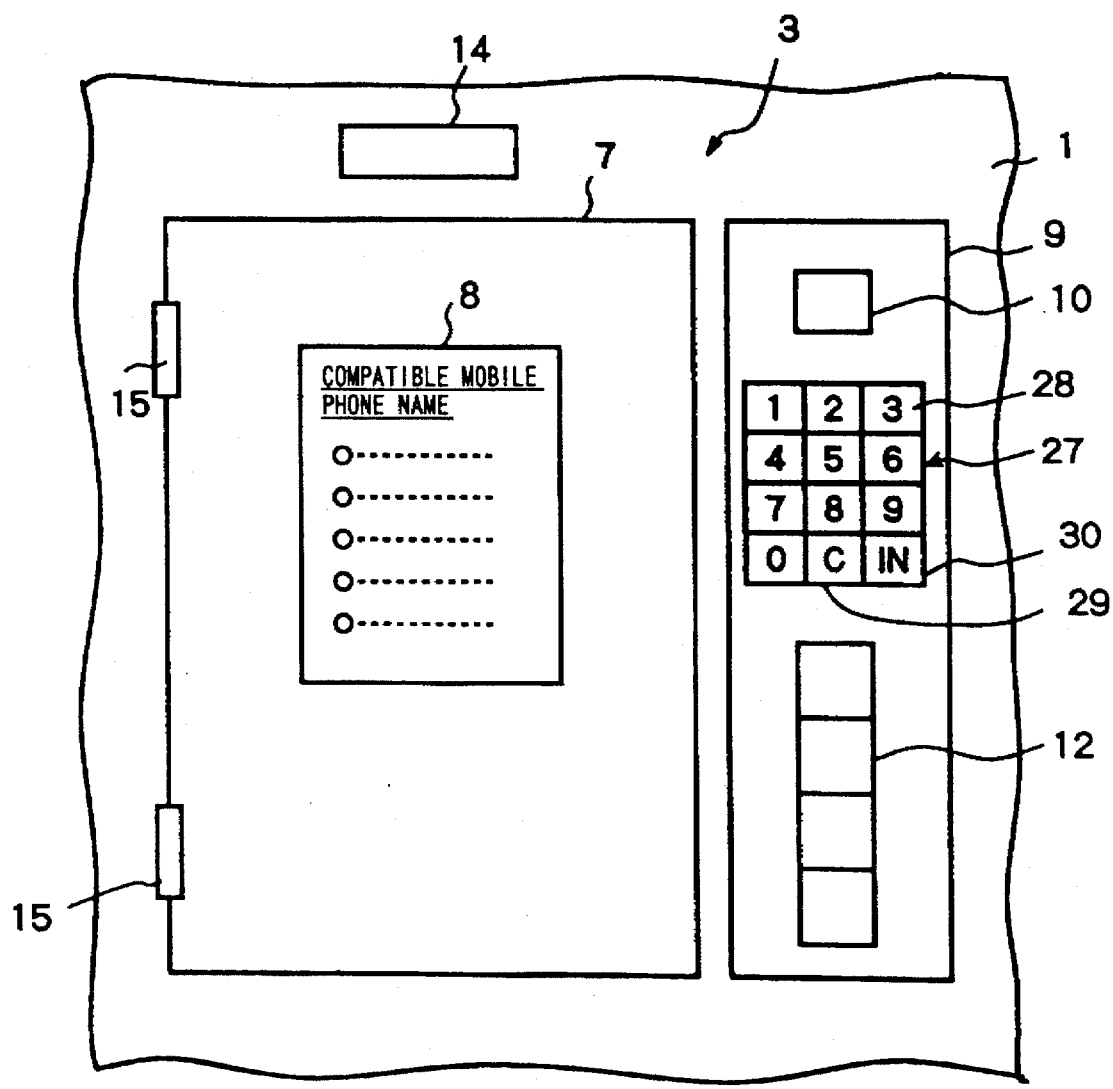
FIG. 14 is a front view of a vending machine where an electric lock system is applied to the door.

FIG. 14 is a front view of a charging block of one modification of the vending machine of the aforesaid embodiment according to the present invention wherein an electric lock system including a ten-key keyboard is applied to the door 7.

As shown in FIG. 14, on the operation panel 9 which is arranged on the right side of the door 7, a ten-key operational section 27 is provided instead of the key 11 in the aforesaid embodiment. A correction key (C) 29 arranged to the ten-key operational section 27 is provided for correcting a secret code input by using numeral keys 28. Thus, the input error to the secret code is corrected and the operator can input the secret code again.

In the ten-key operational section 27, the secret code of four digits, for example, is input through the numeral keys 28. When the input key (IN) 30 is depressed after input of the secret code, the secret code is registered in the control circuit and at the same time the door 7 is electrically locked and the charging operation to the secondary battery of the mobile phone is started.

After a completion of the charging operation, the operator must input the secret code, which has been already registered, through the numeral keys 28. When the secret code is input, the door 7 is unlocked when the input secret code coincides with the registered secret code, thereby accessing the mobile phone with the secondary battery just charged from the vending machine, while the door 7 is opened.

It should be noted that the vending machine may equip a printer in front of the casing 1, for printing the secret code which the operator registered through the ten-key operational section 27. As the printer is equipped to the vending machine, it is possible to avoid an inconvenience where the operator forgets the secret code.

[ANOTHER EMBODIMENT]

It would be clear from the aforementioned description to the preferred embodiment that it is useful and advantageous for the mobile phone holder to provide a vending machine to the public place in accordance with the spread of many sorts of mobile phones. In this case, it is very useful and advantageous for the mobile phone holder when he or she doesn't possess a replacement secondary battery in his or her bag or case and he or she must urgently charge the discharged secondary battery which is attached to the mobile phone to use it.

However, note that the necessities to install the vending machine for charging the secondary battery of the mobile phone are widely different from each other according to the installation sites. That is to say, it would be strongly necessary to install a lot of vending machines each for charging the secondary battery of a plurality of mobile phones or a large capacity to a place where many mobile phone holders concentrate. On the other hand, it would be sufficient to install at least one vending machine with small capacity to a place where a small number of mobile phone holders gather. Furthermore, the needs for installing a vending machine even to the same place will change as a time passes.

In view of the circumstances described above, the description will be given to a vending system for charging a secondary battery of a mobile phone of the other embodiment in which it can flexibly correspond to the needs to install the vending machine, with reference to FIGS. 15 through 18, in which like reference characters designate the same or similar parts throughout the figures thereof.

Figure 15:
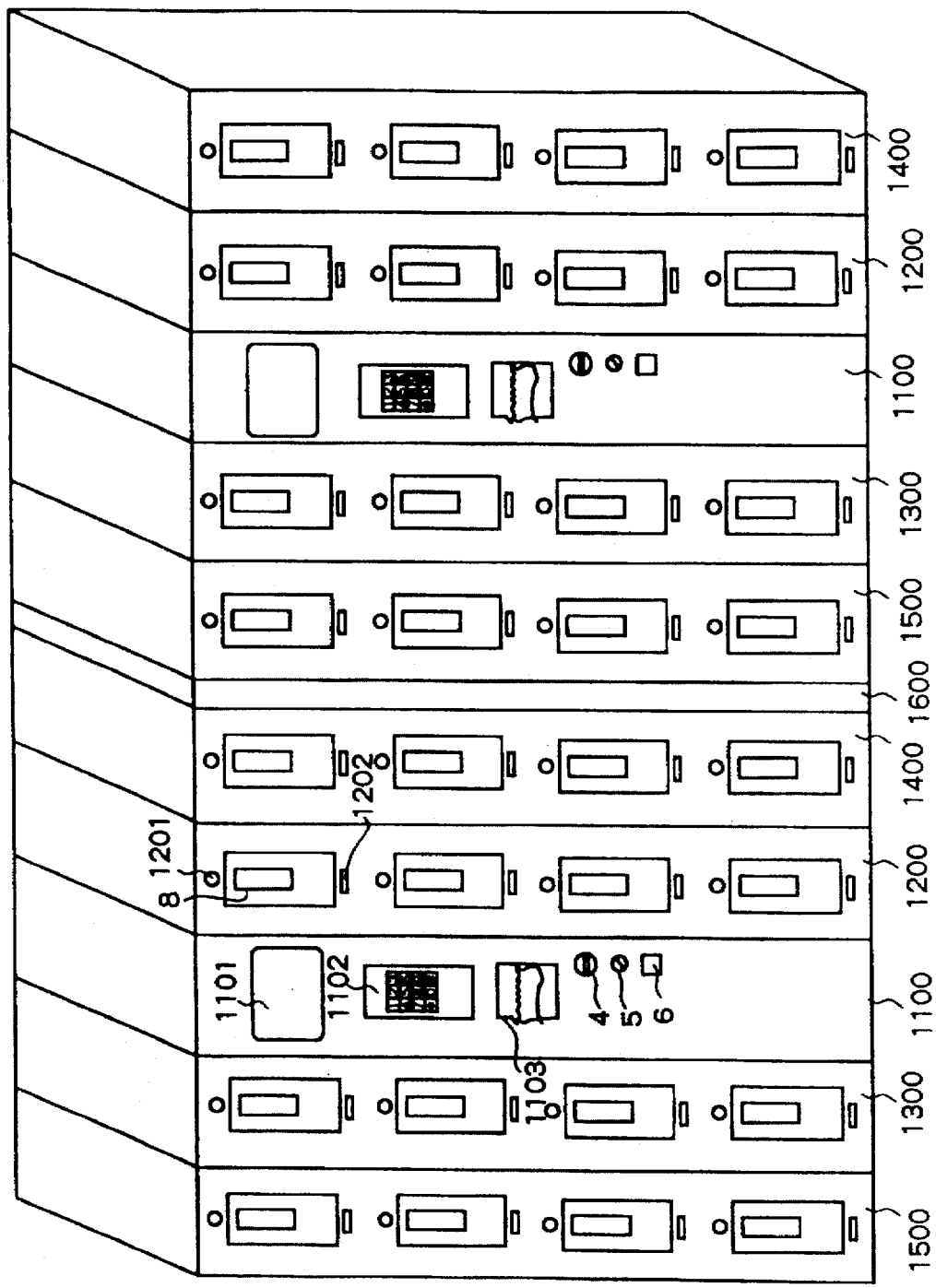
FIG. 15 is a perspective view of a vending system according to another embodiment of the present invention.

FIG. 15 is a perspective view showing a vending system for charging a secondary battery of a mobile phone of the present embodiment. In FIG. 15, it is shown that the vending system includes two maximum configuration sets.

The vending system of the present embodiment includes at least one charging set each composed of a basic control unit 1100 for performing control of supplying electric power, a total construction of the system, administrating the communication between a system user and the system, and four(4) extension charging units 1200, 1300, 1400 and 1500 at most. Each of the extension charging units 1200, 1300, 1400 and 1500 can accommodate four (4) mobile phones into different compartments, respectively, and charge the secondary battery of the accommodated mobile phone. Note that it is a matter of course that the single charging set of the vending system includes a basic control unit and at least one extension charging unit.

That is to say, the minimum configuration of the charging set includes a basic control unit 1100 and a single extension charging unit 1200. The other extension charging units 1300, 1400, 1500 can be further added or connected to the extension charging unit 1200 which has already been included, while combination of the basic control unit 1100 and four(4) extension charging units 1200, 1300, 1400 and 1500 constitute the maximum configuration of the charging set. Accordingly, the maximum configuration of the charging set has a charging capability to charge up sixteen(16) mobile phones.

Further, the maximum configuration of the charging set can be added or connected to the other charging set including the maximum configuration, with separators 1660 sandwiched therebetween as shown in FIG. 15. Namely, a plurality of charging sets are arbitrary connected to each other and installed while the adjacent ones are mechanically coupled through the separators 1600.

In the vending system, all units (that is, the basic control unit and extension charging unit) are electrically connected through cables (not shown). On the other hand, a mechanical connection between units in the vending system or between charging sets are accomplished by two pairs of U-shaped metal fixtures 1250 and 1260; and 1270 and 1280, as shown in FIGS. 16A and 16B.

Figure 16A:
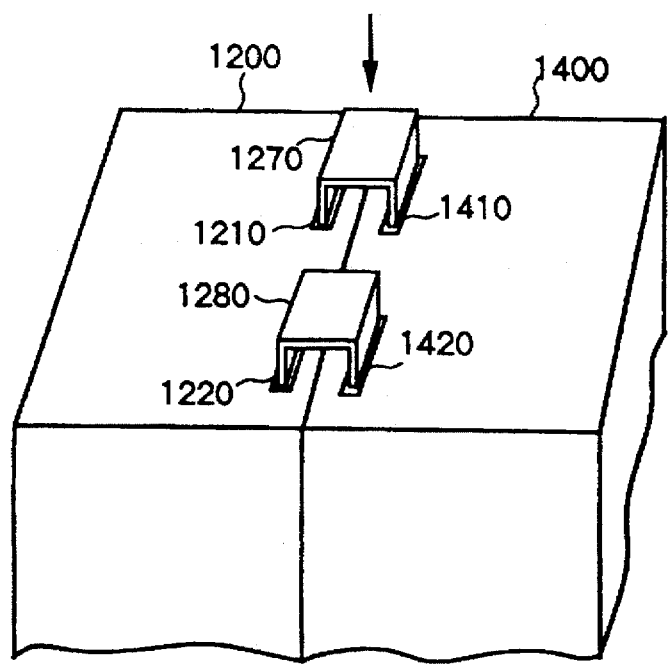
FIGS. 16A and 16B are perspective views showing a mechanism of a unit connection of the vending system shown in FIG. 15.

More specifically, as shown in FIG. 16A, the upper portions of the extension charging units 1200 and 1400 are mechanically connected through the pair of metal fixtures 1270 and 1280, with both legs of the metal fixture 1270 being inserted into an opening 1210 formed to the upper surface of the unit 1200 and an opening 1410 formed to the upper surface of the unit 1400, respectively, while both legs of the metal fixture 1280 being inserted into an opening 1220 formed to the upper surface of the unit 1200 and an opening 1420 formed to the upper surface of the unit 1400, respectively. On the other hand, as shown in FIG. 16B, the lower portions of the extension charging units 1200 and 1400 are mechanically connected through the pair of metal fixtures 1250 and 1260, with both legs of the metal fixture 1250 being inserted into an opening 1230 formed to the under surface of the unit 1200 and an opening 1430 formed to the under surface of the unit 1400, respectively, while both legs of the metal fixture 1260 being inserted into an opening 1240 formed to the under surface of the unit 1200 and an opening 1440 formed to the under surface of the unit 1400, respectively.

Figure 16B:
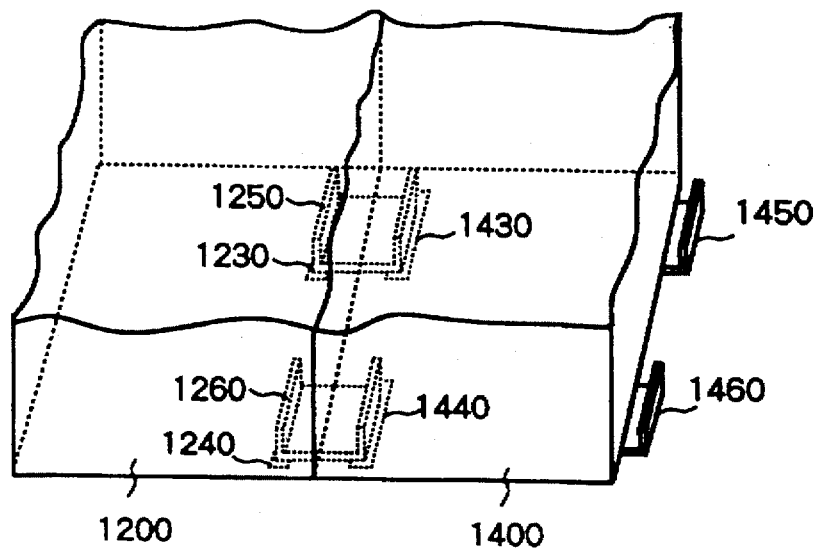

Note that, in FIG. 16B, the reference numerals 1450 and 1460 indicate U-shaped connector for extension of the charging set.

The basic control 1100 includes a LCD (liquid crystal display) 1101 for displaying a message or guidance for operating the system, a ten-key 1102 through which a variety of instructions relating the charging operation are input, a printer 1103 for outputting the system user a necessary information to draw or detach the mobile phone with charged secondary battery from the system after the charging operation, a coin inlet slot 4, a coin return lever 5 and a coin return port 6. It should be noted that it is possible to provide a banknote inlet slot (not shown) in order to receive a banknote.

Each of the extension charging units 1200, 1300, 1400 and 1500 is constructed so as to accommodate a mobile phone and to be able to charge the secondary battery of the mobile phone, which has an interchangeability with respect to the charging system, among mobile phones which are put on the market. Accordingly, on the door 7 which is provided to the front of each of the compartments of the extension charging units, there is attached a notice board or plate 8 on which a plurality of compatible mobile phone names are described. By looking the notice board or plate 8, the system user or mobile phone holder can find the suitable compartment in which his or her secondary battery can be charged.

On the bottom of the compartment, there is provided a mobile phone holder or charge holder (not shown) to which the mobile phone with empty secondary battery to be charged is attached. Note that of the secondary battery of the mobile phone has two electrodes on the bottom thereof and the charge holder has two terminals on the upper surface thereof, and the electrodes are set to be contacted or electrically connected to two terminals, respectively, when the mobile phone is attached to the charge holder.

The door 7 of each of the compartments of the extension charging units is set to be locked/unlocked by means of an electric lock system under control from the basic control unit 1100.

As shown in FIG. 15 again, above each of the compartments, there is arranged a charge lamp 1201 for indicating any of a charging operation stand-by status, a charging status, or a charge completion status. Below each of the compartments, there is attached or adhered a label 1202 on which a discrimination number for specifying the compartment is described.

The charging lamp 1201 includes a green LED for emitting a green color light, a yellow LED for emitting a yellow color light and a red LED for emitting a red color light. These LEDs are set according to the transition of the charging operation. That is, the green LED is turned on when the charge completion is indicated, the yellow LED is turned on when the charging is indicated and the red LED is turned on when the charging operation stand-by is indicated.

Figure 17:
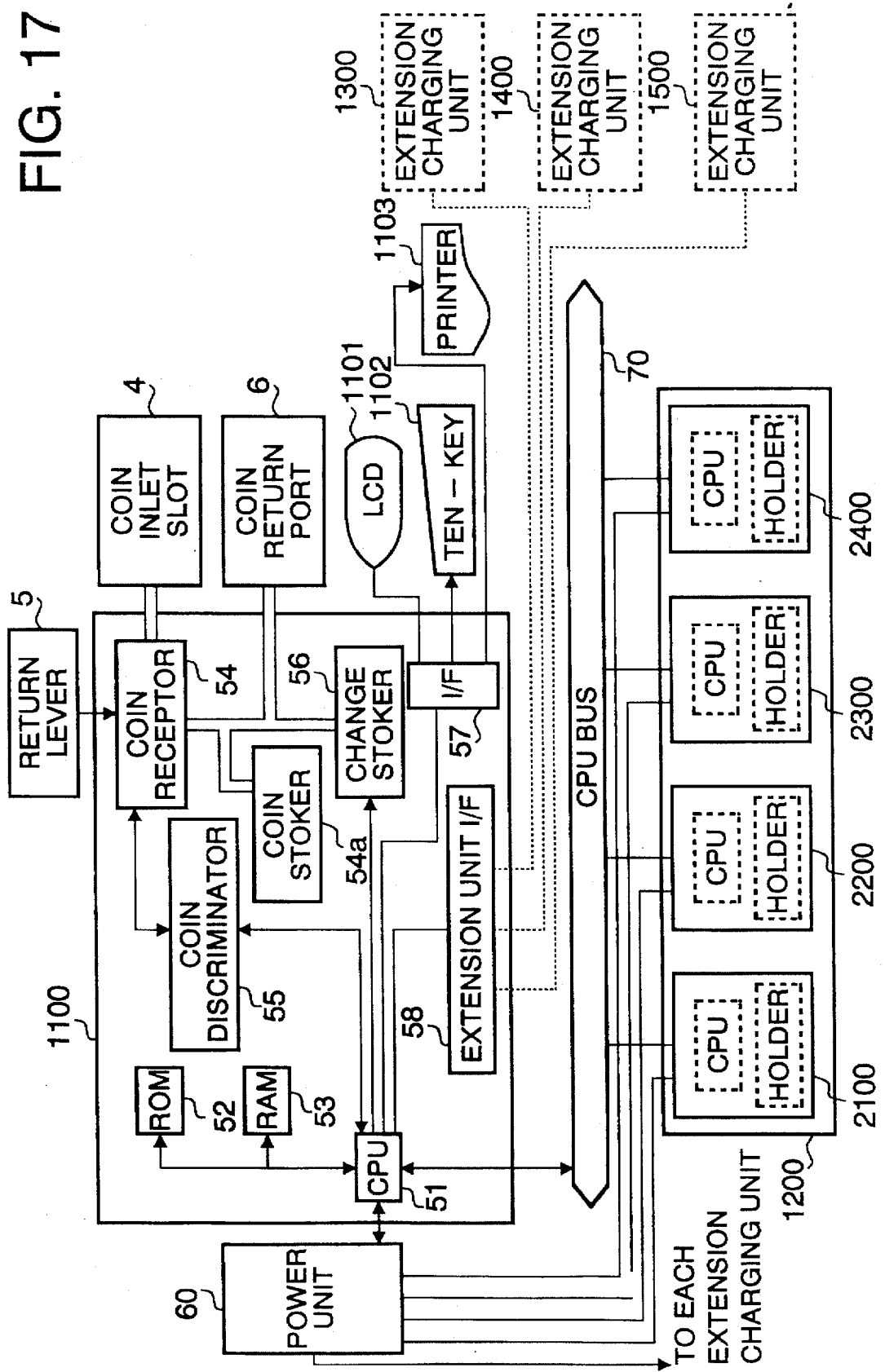
FIG. 17 is a block diagram showing an electrical construction of the vending system shown in FIG. 15.

FIG. 17 is a block diagram for showing the structure of the vending system of the present embodiment, in which like reference numerals or characters designate the same or similar parts throughout the figures thereof.

As shown in FIG. 17, the vending system is provided with the basic control unit 1100, four(4) extension charging units 1200, 1300, 1400 and 1500 each having a compartment 2100, 2200, 2300 and 2400 and a power unit 60 for supplying an electric power to the basic control unit 1100 and extension charging units 1200, 1300, 1400 and 1500.

In the vending system, the basic control unit 1100 and the extension charging unit 1200 are electrically and mutually connected with each other by means of a CPU bus 70 and the basic control unit 1100 and the remaining extension charging units 1300, 1400 and 1500 are electrically and mutually connected by means of an extension unit interface (I/F) 58. Accordingly, it is unnecessary to include the extension unit interface (I/F) 58 where the system is constituted by the minimum configuration, that is, includes the extension charging unit 1200 solely. In other words, it is necessary to add the extension unit interface (I/F) if the extension charging unit or units 1300, 1400 and 1500 are additionally connected to the extension charging unit 1200.

The CPU 51 provided to the basic control unit 1100 is constructed to perform control the lock/unlock of the door 7 of each of the compartments of the extension charging units 1200, 1300, 1400 and 1500 electrically.

Accordingly, basic control unit 1100 and the extension charging units 1200, 1300, 1400 and 1500 constitute a so-called master/slave relationship. On the other hand, each of the extension charging units 1200, 1300, 1400 and 1500 has both of standby mode and active mode, wherein the extension charging units normally remain on standby mode. On the standby mode, the electric power is supplied to one part of the unit, thereby restraining the consumption of the electric power. If it is necessary to execute the charging operation, the mode of the extension charging units 1200, 1300, 1400 and 1500 will be switched from the standby mode to the active mode under the control of the basic control unit 1100.

The basic control unit 1100 includes an interface (I/F) 57 for connecting with the LCD 1101, the ten-key 1102 and the printer 1103 with CPU 51 as well as the extension unit interface (I/F) 58.

Figure 18:
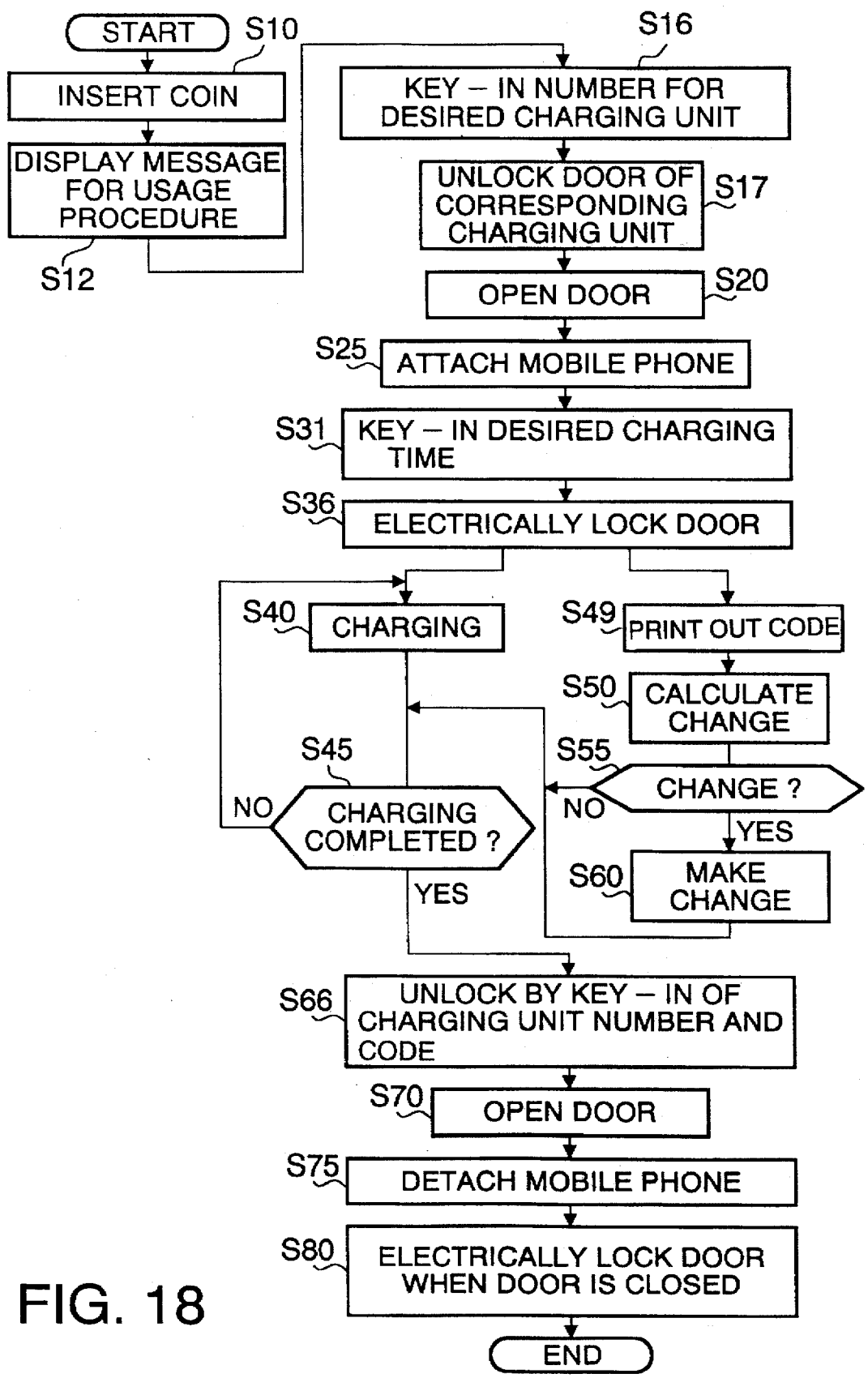
FIG. 18 is a flow chart describing a general operation of the vending system.

FIG. 18 is a flowchart showing the charging operation in the vending system of the present embodiment, in which like reference numerals or characters designate the same or similar steps throughout the figures thereof.

As shown in FIG. 18, when the mobile phone holder inserts a coin through the coin inlet slot 4 in a step S10, the guidance for using the vending system is displayed and indicated on the LCD 1101 in a step S12. According to the guidance displayed on the LCD 1101, the system user or the mobile phone holder searches a compartment suitable for charging the secondary battery of the mobile phone he or she possesses, among all compartments. Then, the mobile phone holder inputs the discrimination number, corresponding to the compartment he or she finds, through the ten-key 1102 in a step S16. At that time, the mobile phone holder depresses "#" key in the ten-key 1101 after the input of the discrimination number in order to inform the CPU 51 the completion of the input operation. Corresponding to the input of the "#", the CPU 51 controls the door 7 to unlock electrically in a step S17. Thereafter, The mobile phone holder opens a door 7 of the corresponding compartment in a step S20, attaches the mobile phone to the charge holder 17 of the corresponding compartment in a step S25, and closes the door 7. If the mobile phone is correctly attached to the charge holder, the red LED is turned on in the charging lamp 1201.

The mobile phone holder then inputs a charging time (for example, 5, 10, 15 or 30 minutes) which he or she desires and which is allowed in view of amount of money of the coin inserted through the slot 4, by means of the ten-key 1102, according to the guidance of the LCD 1101 and then inputs a secret code of four(4) digits in a step S31. For example, if the mobile phone holder wishes to input "30 minutes" as a charging time and "1234" as a secret code, he or she inputs "30*" and then "1234#" from the ten-key 1101.

When the key "#" is input from the ten-key 1101, the door 7 is then automatically locked by key 11 in a step S36. When the door 7 is locked, the charging operation is started in a step S40. Note that the yellow LED is turned on in the charging lamp 1201 during the charging operation.

When the door 7 is locked by the key 7 in the step S36, the printer 1103 prints out the discrimination number and the secret code for unlocking the door 7 in a step 49 while the charging operation is started in the step S40 concurrently.

When the print-out operation is completed in the step S49, a calculation of change is executed in a step S50, based on an amount of money in a coin which has been inserted through the slot 4 and the charging time selected in the step 31.

Note that a term for calculation of the change is usually shorter than that for the charging operation. Accordingly, if it is determined that there is no change in a step S55 after the change calculation, the process will go to a step S45 to detect whether or not the charging operation is halted or completed. On the other hand, if it is determined that there is a change in the step S55, the process will go to a step 60 to make change and discharge the change to the coin return port 6, and go to the step S45, and then wait for the completion of the charging operation in the step S40.

In the step S45, when it is determined that the charging operation is completed or halted, the green LED is turned on in the charging lamp 1201 and the process will go to a step S66. In the step S66, the mobile phone holder inputs the discrimination number for indicating the compartment now on use and the secret code of four(4) digits for unlocking the door 7 by means of the ten-key 1102. When the discrimination number input in the step S16 and the secret code input in the step S31 are coincided to the discrimination number and the secret code input in the step S66, respectively, the door 7 is unlocked electrically under the control of the CPU 51. Then, the door 7 is opened in a step S70 and finally the mobile phone with the secondary battery of which the charging operation is completed is detached from the charge holder in a step S75.

Thereafter, when the door 7 is closed, the door 7 is automatically and electrically locked under the control of the CPU 51.

According to the present embodiment, it can be provided a vending system which can flexibly correspond to the needs for settle the vending machine and adjust the charging capability thereof due to add or reduce the extension charging unit or units.

In the description of the present embodiment, each of the extension charging units can charge four(4) secondary batteries concurrently and each of the charging sets can equip four(4) extension charging units, accordingly can charge sixteen(16) secondary batteries concurrently, however, the present invention is not limited to such a number, but the extension charging unit is possible to charge five(5) or more secondary batteries by including more compartments and the charging set is possible to include five(5) or more extension charging units.

Further in the description of the present embodiment, the secret code is set by the system user or mobile phone holder, however, the present invention is not limited to such a construction but it is possible to issue a secret code from the vending system, printing the secret code by the printer 1103.

Still further in the description of the above embodiments, the charging block or the compartment is at room temperature, however, the present invention is not limited to such a construction but it is possible to equip an air conditioner in the machine or the unit for controlling the temperature in the charging block or the compartment to a constant temperature in view of the discharge characteristics of the secondary battery depending on the temperature thereof.

Furthermore in the description of the above embodiments, the door 7 of each of the charging blocks or compartments is provided with the lock mechanism mechanically or electrically, the present invention is not limited to such a construction but it is possible to eliminate the lock mechanism from the door 7 if the installation site of the vending machine is safe.

Still furthermore in the above embodiments, the charging operation will be executed during a charging time which conforms to the amount of money of the inserted coin, however, the present invention is not limited to such a construction but it is possible to charge the secondary battery during a charging time which is set by the mobile phone holder and clear off the deficit if it exists when the mobile phone is detached from the vending machine after the completion of the charging operation.

As the present invention may be embodied in several forms without departing from the spirit of essential characteristics thereof, the present embodiment is therefore illustrative and not restrictive, since the scope of the present invention is defined by the appended claims rather than by the description preceding them, and all changes that fall within meets and bounds of the claims, or equivalence of such meets and bounds are therefore intended to embraced by the claims.

What is claimed is:

1. A vending machine for charging a secondary battery of a mobile phone, comprising:

a plurality of charging means, each conforming to a specification of a mobile phone and a secondary battery of the mobile phone, for charging plural kinds of secondary batteries used in plural kinds of mobile phones;

instruction means for instructing a charging time corresponding to each of said plurality of charging means;

lock/unlock means for locking/unlocking a key on a door provided in each of said plurality of charging means;

reception means for receiving at least one coin and/or at least one banknote;

calculation means for calculating an amount of money of said coin and/or bill which have been received in said reception means; and charging control means for controlling each of said plurality of charging means to charge a secondary battery of a mobile phone attached in one of said plurality of charging means, in accordance with the amount of money calculated by said calculation means and the charging time instructed by said instruction means.

2. The vending machine according to claim 1, wherein said calculation means includes:

comparison means for comparing the amount of money of said coin and/or banknote received in said reception means with an amount of money equivalent to the charging time instructed by said instruction means and outputting a compare result; and change control means for controlling to make change in accordance with the comparison result from said comparison means.

3. The vending machine according to claim 1, wherein each of said plurality of charging means includes:

a quick charger conforming to a predetermined type of mobile phone and a predetermined type of secondary battery, for quickly charging the secondary battery attached to the corresponding charging means; and display means for displaying status of charging operation of said quick charger.

4. The vending machine according to claim 3, wherein said quick recharger includes at least two electrodes through which the electric power is to be supplied to the secondary battery, and positions of said electrodes, a shape of each of said electrodes and a charging voltage of said quick charger are uniquely defined according to a specification of said mobile phone and said secondary battery attached thereto.

5. The vending machine according to claim 3, wherein said display means includes a plurality of LEDs (light emitting devices), each of which lights in a different color, and is turned on in accordance with progress of charging operation.

6. The vending machine according to claim 1, wherein said plurality of secondary batteries include at least Ni—Cd battery, Ni—MH battery and Li-ION battery.

7. The vending machine according to claim 1, wherein said charging control means includes:

sensing means for sensing whether or not the door in said charging means is locked by said lock/unlock means and for outputting a sensing result; and start control means for controlling start of charging the secondary battery of the mobile phone which has been attached in said charging means in accordance with the sensing result from said sensing means.

8. The vending machine according to claim 3, wherein said quick charger includes:

a holder for holding an electric contact with electrodes of said secondary battery:

a voltmeter for measuring a terminal voltage of said secondary battery;

a differentiation circuit for measuring a change rate in time of the terminal voltage;

a constant current charging circuit for quickly charging the secondary battery;

a first comparator for comparing the terminal voltage measured by said voltmeter with a predetermined charging voltage defined for the secondary battery;

a second comparator for measuring the change rate in time of the terminal voltage measured by said differentiation circuit with a predetermined threshold;

a register for setting the predetermined threshold; and a controller for performing control in accordance with the comparison results by said first and second comparators such that charging operation in said constant current charging circuit is halted before the secondary battery reaches full-charged condition.

9. The vending machine according to claim 8, wherein said controller further performs control such that charging operation is halted when it is determined that the secondary battery reaches within a range from approximately 60% to approximately 90% of the full-charged condition.

10. The vending machine according to claim 8, wherein said second comparator employs a value very close to "0" as the predetermined threshold.

11. The vending machine according to claim 3, wherein said quick charger includes:

a holder for holding an electric contact with electrodes of the secondary battery:

measuring means for measuring a terminal voltage of said secondary battery;

comparison means for comparing the terminal voltage measured by said first measuring means with a predetermined limited voltage defined for said secondary battery;

charging means for quickly charging the secondary battery; and charging control means for performing control in accordance with the comparison results by said comparison means such that charging operation in said charging means is halted when it is determined in accordance with the comparison result by said comparison means that the terminal voltage exceeds to a predetermined limited voltage before the secondary battery reaches full-charged condition.

12. The vending machine according to claim 11, wherein said predetermined limited voltage is defined within a range from approximately 60% to approximately 90% of the maximum charging voltage defined for said secondary battery.

13. A charging apparatus for charging a secondary battery, comprising:

a holder for holding an electric contact with electrodes of the secondary battery:

first measuring means for measuring a terminal voltage of said secondary battery;

second measuring means for measuring a change rate in time of the terminal voltage;

charging means for quickly charging the secondary battery;

a first comparison means for comparing the terminal voltage measured by said first measuring means with a predetermined charging voltage defined for the secondary battery;

a second comparison means for comparing the change rate in time of the terminal voltage measured by said second measuring means with a predetermined threshold; and charging control means for performing control in accordance with the comparison results by said first and second comparing means such that charging operation in said charging means is halted before the secondary battery reaches full-charged condition.

14. The apparatus according to claim 13, wherein said charging means includes a constant current charging circuit for quickly charging the secondary battery.

15. The apparatus according to claim 13, further comprising:

a register for setting the predetermined threshold.

16. The apparatus according to claim 13, wherein said first measuring means includes a voltmeter, and said second measuring means includes a differentiation circuit.

17. The apparatus according to claim 13, wherein said charging control means performs control such that charging operation is halted when it is determined in accordance with the comparison result by said first comparison means that the terminal voltage exceeds the predetermined charging voltage.

18. The apparatus according to claim 13, wherein said second comparison means employs a value very close to "0" as the predetermined threshold.

19. The apparatus according to claim 13, wherein said secondary batteries include at least Ni—Cd battery, Ni—MH battery and Li-ION battery.

20. The apparatus according to claim 13, wherein said charging control means performs control such that charging operation is halted when it is determined that the secondary battery reaches within a range from approximately 60% to approximately 90% of the full-charged condition.

21. A charging apparatus for charging a secondary battery, comprising:

a holder for holding an electric contact with electrodes of the secondary battery:

measuring means for measuring a terminal voltage of said secondary battery;

comparison means for comparing the terminal voltage measured by said first measuring means with a predetermined limited voltage defined for said secondary battery;

charging means for quickly charging the secondary battery;

charging control means for performing control in accordance with the comparison results by said comparison means such that the charging operation in said charging means is halted before the secondary battery reaches full-charged condition.

22. The apparatus according to claim 21, wherein said charging means includes a constant current charging circuit for charging at a constant current.

23. The apparatus according to claim 21, wherein said measurement means includes a voltmeter.

24. The apparatus according to claim 21, wherein said secondary batteries include at least Ni—Cd battery, Ni—MH battery and Li-ION battery.

25. The apparatus according to claim 21, wherein said charging operation is halted when it is determined that the terminal voltage measured by said measuring means reaches approximately 60% to 90% of the maximum charged voltage defined for said secondary battery.

26. A vending system composed of at least one first unit which includes a plurality of charging means, each conforming to a specification of a mobile phone and a secondary battery of the mobile phone, for charging plural kinds of secondary batteries used in plural kinds of mobile phones, and a second unit which performs charging control on each of the plurality of charging means, comprising:

first extension means for electrically connecting at most a first predetermined number of the first units to the second unit; and second extension means for mechanically connecting plural number of sets, each composed of the first predetermined number of the first units and one second unit, with each other.

27. The system according to claim 26, wherein said second unit includes:
- display means for displaying a guidance concerning with the charging operation with respect to each of said plurality of charging means;
- instruction means for instructing a charging time corresponding to each of said plurality of charging means;
- lock/unlock means for locking/unlocking a key on a door provided in each of said plurality of charging means; and
- output means for outputting an information for unlocking the key on the door.

28. The system according to claim 27, wherein said display means includes an LCD liquid crystal device, said instruction means includes ten keys, and said output means includes a printer.

29. The system according to claim 27, wherein said second unit further includes:
- reception means for receiving at least one coin and/or at least one banknote;
- calculation means for calculating an amount of money of said coin and/or bill which have been received in said reception means; and
- change control means for calculating a change based on the amount of money calculated by said calculation means and the charging time instructed by said instruction means, and controlling change return in accordance with the calculation result if necessary.

30. The system according to claim 26, wherein said plurality of secondary batteries include at least Ni—Cd battery, Ni—MH battery and Li-ION battery.

31. The system according to claim 26, wherein each of said plurality of charging means in said first unit includes LEDs, each of which lights in a different color, and is turned on in accordance with progress of charging operation.

* * * * *